United States Patent
Laustsen et al.

(10) Patent No.: US 12,441,783 B2
(45) Date of Patent: Oct. 14, 2025

(54) PATHOGEN BINDING PROTEINS

(71) Applicant: Bactolife A/S, Copenhagen Ø (DK)

(72) Inventors: Andreas Hougaard Laustsen, Copenhagen N (DK); Sandra Wingaard Thrane, Herlev (DK); Mads Aage Laustsen, Gentofte (DK)

(73) Assignee: Bactolife APS, Gentofte (DK)

( * ) Notice: Subject to any disclaimer, the term of this patent is extended or adjusted under 35 U.S.C. 154(b) by 1027 days.

(21) Appl. No.: 17/418,906

(22) PCT Filed: Jan. 7, 2020

(86) PCT No.: PCT/EP2020/050183
§ 371 (c)(1),
(2) Date: Jun. 28, 2021

(87) PCT Pub. No.: WO2020/144164
PCT Pub. Date: Jul. 16, 2020

(65) Prior Publication Data
US 2022/0119505 A1  Apr. 21, 2022

(30) Foreign Application Priority Data
Jan. 7, 2019 (WO) ............... PCT/DK2019/050004
Oct. 7, 2019 (EP) ..................... 19201645

(51) Int. Cl.
C07K 16/00 (2006.01)
A61K 39/00 (2006.01)
A61P 1/12 (2006.01)
A61P 31/04 (2006.01)
C07K 16/12 (2006.01)

(52) U.S. Cl.
CPC ............ *C07K 16/1232* (2013.01); *A61P 1/12* (2018.01); *A61P 31/04* (2018.01); *A61K 2039/505* (2013.01); *C07K 2317/31* (2013.01); *C07K 2317/569* (2013.01); *C07K 2317/64* (2013.01); *C07K 2317/76* (2013.01); *C07K 2317/92* (2013.01); *C07K 2317/94* (2013.01)

(58) Field of Classification Search
None
See application file for complete search history.

(56) References Cited

U.S. PATENT DOCUMENTS

| | | | |
|---|---|---|---|
| 9,320,792 | B2 | 4/2016 | Bouche et al. |
| 10,202,441 | B2 | 2/2019 | Shoemaker |
| 10,704,040 | B2 | 7/2020 | Tran et al. |
| 2013/0136744 | A1 | 5/2013 | Bouche et al. |
| 2016/0318996 | A1 | 11/2016 | Hollands et al. |
| 2017/0173179 | A1 | 6/2017 | Sawada et al. |

FOREIGN PATENT DOCUMENTS

| | | | |
|---|---|---|---|
| EP | 1558645 | | 8/2005 |
| WO | 1988/09344 | A1 | 12/1988 |
| WO | 1992/15682 | A1 | 9/1992 |
| WO | 1993/16185 | A2 | 8/1993 |
| WO | 1994/04678 | A1 | 3/1994 |
| WO | 1999/46300 | A1 | 9/1999 |
| WO | 2020/035741 | A2 | 1/2003 |
| WO | 2005/017148 | A1 | 2/2005 |
| WO | 2005/044858 | | 5/2005 |
| WO | 2006/056306 | | 6/2006 |
| WO | 2006/079372 | A1 | 8/2006 |
| WO | 2006/127798 | | 11/2006 |
| WO | 2007/010040 | | 1/2007 |
| WO | 2007/025977 | | 3/2007 |
| WO | 2020/099922 | A1 | 1/2009 |
| WO | 2009/095235 | | 8/2009 |
| WO | 2009/147248 | | 12/2009 |
| WO | 2010/125187 | | 11/2010 |
| WO | WO2011051327 | A2 * | 5/2011 ........... C07K 16/468 |
| WO | 2011/124612 | | 10/2011 |
| WO | 2012/025619 | | 3/2012 |
| WO | 2012/025621 | A1 | 3/2012 |
| WO | 2012/042026 | A1 | 4/2012 |
| WO | 2012150319 | A1 | 11/2012 |
| WO | 2013135896 | A1 | 9/2013 |
| WO | 202013144266 | A1 | 10/2013 |
| WO | 2014/033313 | A1 | 3/2014 |
| WO | 2014/177595 | A1 | 11/2014 |
| WO | 2014/191146 | A1 | 12/2014 |
| WO | 2015/080099 | A1 | 6/2015 |
| WO | 2016/071438 | A2 | 5/2016 |

(Continued)

OTHER PUBLICATIONS

Kritas, S.K. (2018). Probiotics and Prebiotics for the Health of Pigs and Horses. In: Di Gioia, D., Biavati, B. (eds) Probiotics and Prebiotics in Animal Health and Food Safety. Springer, Cham. https://doi.org/10.1007/978-3-319-71950-4_4. (Year: 2018).*
Beirnaert E, et al. Bivalent Llama Single-Domain Antibody Fragments against Tumor Necrosis Factor Have Picomolar Potencies due to Intramolecular Interactions. Front Immunol. Jul. 31, 2017;8:867. (2017) (Year: 2017).*
Alzogaray, V. et al., Single-domain llama antibodies as specific intracellular inhibitors of SpvB, the actin ADP-ribosylating toxin of *Salmonella typhimurium*, The FASEB Journal, 25(2): 526-534, Feb. 1, 2011.
Conrath et al., Camel Single-domain Antibodies as modular Building Units in Bispecific and Bivalent Antibody Constructs, Journal of Biological Chemistry, 276(10): 7346-7350, Oct. 25, 2000.

(Continued)

*Primary Examiner* — Janet L Epps-Smith
*Assistant Examiner* — Estella M. Gustilo
(74) *Attorney, Agent, or Firm* — DINSMORE & SHOHL LLP

(57) ABSTRACT

The present invention relates to proteins, compositions and their use, wherein said protein comprises a first peptide having a first binding specificity, a second peptide having a second binding specificity and a linker, wherein said first and said second peptides bind at least one pathogen surface component and/or at least one molecule produced by a pathogen.

23 Claims, 12 Drawing Sheets

Specification includes a Sequence Listing.

(56) References Cited

FOREIGN PATENT DOCUMENTS

| WO | 2016/156465 | A1 | 10/2016 |
|---|---|---|---|
| WO | 2016/156466 | A1 | 10/2016 |
| WO | 2016/156468 | A1 | 10/2016 |
| WO | 2017/167997 | A1 | 10/2017 |
| WO | 2017/171535 | A2 | 10/2017 |
| WO | 2020/234642 | | 11/2020 |
| WO | 2020/254826 | | 12/2020 |
| WO | 2020/254827 | | 12/2020 |
| WO | 2020/254828 | | 12/2020 |
| WO | 2021/003456 | A1 | 1/2021 |
| WO | 2021/110816 | A1 | 6/2021 |
| WO | 2021/110817 | A1 | 6/2021 |

OTHER PUBLICATIONS

Gonzales, L. et al., Alkaline pH is a Signal for Optimal Production and Secretion of the Heat Labile Toxin, LT in Enterotoxigenic *Escherichia coli* (ETEC). PLoS One: e74069, Sep. 18, 2013.

Harmsen, M. et al., Enhancement of toxin- and virus neutralizing capacity of single-domain antibody fragments by N-glycosylation, Appl. Microbiol. Biotechnol., 84: 1087-1094, 2009.

Harmsen, M. et al., Selection and optimization of proteolytically stable llama single-domain antibody fragments for oral immunotherapy, Appl. Microbiol. Biotechnol., 72: 544-551, 2006.

Harmsen, M. et al., Properties, production, and applications of camelid single-domain antibody fragments, Applied Microbiology and Biotechnology, 77(1): 13-22, Aug. 18, 2007.

Hussack et al., Neutralization of Clostridium difficile toxin A with single domain antibodies targeting the cell receptor binding domain, Journal of Biological Chemistry, 286(11): 8961-8976, Mar. 18, 2011.

Lo, A. et al., The molecular mechanism of Shiga toxin Stx2e neutralization by a single-domain antibody targeting the cell receptor-binding domain, J. Biol. Chem. 289: 25374-25381, 2014.

Moonens, K. et al., Nanobody Mediated Inhibition of Attachment of F18 Fimbriae Expressing *Escherichia coli*, PLoS One, 9(12): e114691, 2014.

Stone et al., A novel pentamer versus pentamer approach to generating neutralizers of verotoxin 1, Molecular Immunology, 44(9): 2487-2491, Jan. 17, 2007.

Van Den Broeck, W. et al., Receptor-Dependent Immune Responses in Pigs after Oral Immunization with F4 Fimbriae, Infect. Immun., 67: 520-526, 1999.

Virdi, V. et al., Orally fed seeds producing designer IgAs protect weaned piglets against enterotoxigenic *Escherichia coli* infection, PNAS, 110: 11809-11814, 2013.

\* cited by examiner

A)

B)

A)

B)

C)

A)

B)

A)

B)

A)

B)

SEQUENCE LISTING

```
<160> NUMBER OF SEQ ID NOS: 32

<210> SEQ ID NO 1
<211> LENGTH: 121
<212> TYPE: PRT
<213> ORGANISM: Unknown
<220> FEATURE:
<223> OTHER INFORMATION: F41
<220> FEATURE:
<221> NAME/KEY: PEPTIDE
<222> LOCATION: (1)..(121)
<223> OTHER INFORMATION: F41

<400> SEQUENCE: 1

Gln Val Gln Leu Gln Glu Ser Gly Gly Gly Leu Val Gln Ala Gly Gly
1               5                   10                  15

Ser Leu Arg Leu Ser Cys Glu Ala Ser Gly Asn Val Asp Arg Ile Asp
            20                  25                  30

Ala Met Gly Trp Phe Arg Gln Ala Pro Gly Lys Gln Arg Glu Phe Val
        35                  40                  45

Gly Tyr Ile Ser Glu Gly Gly Ile Leu Asn Tyr Gly Asp Phe Val Lys
    50                  55                  60

Gly Arg Phe Thr Ile Ser Arg Asp Asn Ala Lys Asn Thr Val Tyr Leu
65                  70                  75                  80

Gln Met Ser Asn Leu Lys Ser Glu Asp Thr Gly Val Tyr Phe Cys Ala
                85                  90                  95

Ala Ser His Trp Gly Thr Leu Leu Ile Lys Gly Ile Glu His Trp Gly
            100                 105                 110

Lys Gly Thr Gln Val Thr Val Ser Ser
        115                 120

<210> SEQ ID NO 2
<211> LENGTH: 121
<212> TYPE: PRT
<213> ORGANISM: Unknown
<220> FEATURE:
<223> OTHER INFORMATION: F42
<220> FEATURE:
<221> NAME/KEY: PEPTIDE
<222> LOCATION: (1)..(121)
<223> OTHER INFORMATION: F42
```

-continued

```
<400> SEQUENCE: 2

Gln Val Gln Leu Gln Glu Ser Gly Gly Gly Leu Val Gln Pro Gly Gly
1               5                   10                  15

Ser Leu Arg Leu Ser Cys Thr Ala Ser Gly Ser Ile Ser Ser Ile Asn
            20                  25                  30

Ala Met Gly Trp Tyr Arg Gln Ala Pro Gly Ser Lys Arg Glu Phe Val
        35                  40                  45

Ala His Ile Thr Asn Thr Gly Val Thr Glu Phe Ala Asp Ser Val Lys
    50                  55                  60

Gly Arg Phe Thr Ile Ser Arg Asp Asn Ala Lys Thr Thr Val Asp Leu
65                  70                  75                  80

Gln Met Asn Ser Leu Lys Pro Glu Asp Thr Ala Val Tyr Tyr Cys Ala
                85                  90                  95

Ala Thr Asp Trp Gly Thr Leu Leu Ile Lys Gly Ile Asp His Trp Gly
            100                 105                 110

Lys Gly Thr Gln Val Thr Val Ser Ser
        115                 120

<210> SEQ ID NO 3
<211> LENGTH: 121
<212> TYPE: PRT
<213> ORGANISM: Unknown
<220> FEATURE:
<223> OTHER INFORMATION: F43
<220> FEATURE:
<221> NAME/KEY: PEPTIDE
<222> LOCATION: (1)..(121)
<223> OTHER INFORMATION: F43

<400> SEQUENCE: 3

Gln Val Gln Leu Gln Glu Ser Gly Gly Gly Leu Val Gln Ala Gly Gly
1               5                   10                  15

Ser Leu Arg Leu Ser Cys Ala Ala Ser Gly Leu Thr Phe Asp Thr Tyr
            20                  25                  30

Ala Met Gly Trp Phe Arg Gln Ala Pro Gly Lys Lys Arg Glu Tyr Val
        35                  40                  45

Ala Ala Ile Ser Trp Thr Gly Ile Ser Thr Tyr Tyr Ala Asp Ile Ala
    50                  55                  60

Lys Gly Arg Phe Thr Ile Ser Arg Asp Asn Ala Lys Asn Thr Leu Tyr
65                  70                  75                  80

Leu Gln Met Asp Ser Leu Lys Pro Glu Asp Thr Ala Val Tyr Tyr Cys
                85                  90                  95

Ala Ala Gln Lys Ser Leu Asn Val Pro Ala Pro Trp Asp Tyr Trp Gly
            100                 105                 110

Gln Gly Thr Gln Val Thr Val Ser Ser
        115                 120

<210> SEQ ID NO 4
<211> LENGTH: 121
<212> TYPE: PRT
<213> ORGANISM: Unknown
<220> FEATURE:
<223> OTHER INFORMATION: F44
<220> FEATURE:
<221> NAME/KEY: PEPTIDE
<222> LOCATION: (1)..(121)
<223> OTHER INFORMATION: F44

<400> SEQUENCE: 4

Gln Val Gln Leu Gln Glu Ser Gly Gly Gly Leu Val Gln Ala Gly Gly
```

```
                1               5                  10                 15
Ser Leu Arg Leu Ser Cys Ala Ala Ser Gly Leu Thr Phe Asp Thr Tyr
                20                 25                 30

Ala Met Gly Trp Phe Arg Gln Ala Pro Gly Lys Lys Arg Glu Tyr Val
                35                 40                 45

Ala Ala Ile Ser Trp Thr Gly Ile Ser Thr Tyr Tyr Ala Asp Ile Ala
                50                 55                 60

Lys Gly Arg Phe Thr Ile Ser Arg Asp Asn Ala Lys Asn Thr Leu Tyr
65                 70                 75                 80

Leu Gln Met Asp Ser Leu Lys Pro Glu Asp Thr Ala Val Tyr Tyr Cys
                85                 90                 95

Ala Ala Gln Arg Ser Leu Asn Val Pro Ala Pro Trp Asp Tyr Trp Gly
                100                105                110

Gln Gly Thr Gln Val Thr Val Ser Ser
                115                120
```

<210> SEQ ID NO 5
<211> LENGTH: 122
<212> TYPE: PRT
<213> ORGANISM: Unknown
<220> FEATURE:
<223> OTHER INFORMATION: Stx2e1
<220> FEATURE:
<221> NAME/KEY: PEPTIDE
<222> LOCATION: (1)

```
                    20                  25                  30

Ser Met Gly Trp Phe Arg Gln Ala Pro Gly Lys Glu Arg Glu Gly Val
            35                  40                  45

Ala Cys Ile Asp Thr Ser Gly Ile Val Asn Tyr Ala Asp Ser Val Lys
 50                  55                  60

Gly Arg Phe Thr Ile Ser Gln Asp Ser Ala Lys Lys Thr Leu Tyr Leu
 65                  70                  75                  80

Glu Met Asn Ser Leu Lys Pro Glu Asp Thr Ala Leu Tyr Ser Cys Ala
                85                  90                  95

Thr Gly Pro Phe Val Tyr Gly Arg Gly Cys Leu Gly Gln Ala Phe Tyr
               100                 105                 110

Ser Tyr Trp Gly Gln Gly Thr Gln Val Thr Val Ser Ser
               115                 120                 125

<210> SEQ ID NO 7
<211> LENGTH: 125
<212> TYPE: PRT
<213> ORGANISM: Unknown
<220> FEATURE:
<223> OTHER INFORMATION: F182
<220> FEATURE:
<221> NAME/KEY: PEPTIDE
<222> LOCATION: (1)..(125)
<223> OTHER INFORMATION: F182

<400> SEQUENCE: 7

Gln Val Gln Leu Gln Glu Ser Gly Gly Gly Ser Val Gln Ala Gly Gly
 1               5                  10                  15

Ser Leu Arg Leu Ser Cys Thr Ala Ser Gly Tyr Thr Tyr Arg Lys Tyr
                20                  25                  30

Cys Met Gly Trp Phe Arg Gln Ala Pro Gly Lys Glu Arg Glu Gly Val
            35                  40                  45

Ala Cys Ile Asn Ser Gly Gly Gly Thr Ser Tyr Tyr Ala Asp Ser Val
 50                  55                  60

Lys Gly Arg Phe Thr Ile Ser Gln Asp Asn Ala Lys Asp Thr Val Phe
 65                  70                  75                  80

Leu Arg Met Asn Ser Leu Lys Pro Glu Asp Thr Ala Ile Tyr Tyr Cys
                85                  90                  95

Ala Leu Ser Ser Asn Ser Val Cys Pro Pro Gly His Val Ala Trp Tyr
               100                 105                 110

Asn Asp Trp Gly Gln Gly Thr Gln Val Thr Val Ser Ser
               115                 120                 125

<210> SEQ ID NO 8
<211> LENGTH: 129
<212> TYPE: PRT
<213> ORGANISM: Unknown
<220> FEATURE:
<223> OTHER INFORMATION: F183
<220> FEATURE:
<221> NAME/KEY: PEPTIDE
<222> LOCATION: (1)..(129)
<223> OTHER INFORMATION: F183

<400> SEQUENCE: 8

Gln Val Gln Leu Gln Glu Ser Gly Gly Gly Ser Val Gln Ala Gly Gly
 1               5                  10                  15

Ser Leu Arg Leu Ser Cys Ala Ala Ser Gly Tyr Thr Tyr Ser Ser Asn
                20                  25                  30

Cys Met Ala Trp Phe Arg Gln Val Pro Gly Lys Glu Arg Glu Gly Val
```

```
                        35                  40                  45

Ala Ser Ile Asn Thr Arg Gly Gly Ile Thr Tyr Tyr Ala Asp Ser Val
    50                  55                  60

Lys Gly Arg Phe Thr Ile Ser Arg Asp Asn Ala Lys Asn Thr Val Ser
 65                  70                  75                  80

Leu Gln Met Asn Ser Leu Lys Pro Glu Asp Thr Ala Thr Tyr Tyr Cys
                 85                  90                  95

Ala Ala Val Arg Glu Ala Thr Tyr Ser Asp Asn Arg Cys Ser Val Arg
            100                 105                 110

Ser Tyr Thr Tyr Asp Tyr Trp Gly Gln Gly Thr Gln Val Thr Val Ser
        115                 120                 125

Ser

<210> SEQ ID NO 9
<211> LENGTH: 125
<212> TYPE: PRT
<213> ORGANISM: Unknown
<220> FEATURE:
<223> OTHER INFORMATION: LT1
<220> FEATURE:
<221> NAME/KEY: PEPTIDE
<222> LOCATION: (1)..(125)
<223> OTHER INFORMATION: LT1

<400> SEQUENCE: 9

Gln Val Gln Leu Gln Gln Ser Gly Gly Gly Leu Val Gln Ala Gly Gly
 1               5                  10                  15

Ser Leu Arg Leu Ser Cys Ala Ala Ser Gly Phe Thr Phe Asp Asp Tyr
             20                  25                  30

Ala Ile Gly Trp Phe Arg Gln Ala Pro Gly Lys Glu Arg Glu Gly Ile
         35                  40                  45

Ser Ser Ile Val Gly Ser Asp Asn Tyr Thr Trp Tyr Thr Asp Ser Val
    50                  55                  60

Lys Gly Arg Phe Thr Ile Ser Ser Asp Asn Thr Arg Ser Thr Val Tyr
 65                  70                  75                  80

Leu Gln Met Asn Ser Leu Lys Pro Glu Asp Thr Ala Val Tyr Tyr Cys
                 85                  90                  95

Ala Ala Asp Ser Tyr Ser Asp Tyr Val Ser Leu Asn Pro Glu Thr Phe
            100                 105                 110

Gly Ser Trp Gly Gln Gly Thr Gln Val Thr Val Ser Ser
        115                 120                 125

<210> SEQ ID NO 10
<211> LENGTH: 125
<212> TYPE: PRT
<213> ORGANISM: Unknown
<220> FEATURE:
<223> OTHER INFORMATION: F45
<220> FEATURE:
<221> NAME/KEY: PEPTIDE
<222> LOCATION: (1)..(125)
<223> OTHER INFORMATION: F45

<400> SEQUENCE: 10

Gln Val Gln Leu Gln Glu Ser Gly Gly Gly Leu Val Gln Pro Gly Gly
 1               5                  10                  15

Ser Leu Arg Leu Ser Cys Leu Val Ser Gly Gly Thr Phe Ser Trp Tyr
             20                  25                  30

Ala Met Gly Trp Phe Arg Gln Ala Pro Gly Lys Glu Arg Glu Phe Val
         35                  40                  45
```

```
Ala Thr Val Ser Arg Gly Gly Ser Ser Tyr Tyr Ala Asp Ser Val
 50                  55                  60

Lys Gly Arg Phe Thr Ile Ser Arg Asp Asn Ala Lys Asn Thr Val Tyr
 65                  70                  75                  80

Leu Gln Met Asn Ser Leu Lys Pro Glu Asp Thr Ala Val Tyr Tyr Cys
                 85                  90                  95

Ala Ala Gly Arg Gly Ala Pro Ser Asp Thr Gly Arg Pro Asp Glu Tyr
                100                 105                 110

Asp Tyr Trp Gly Gln Gly Thr Gln Val Thr Val Ser Ser
            115                 120                 125

<210> SEQ ID NO 11
<211> LENGTH: 273
<212> TYPE: PRT
<213> ORGANISM: Unknown
<220> FEATURE:
<223> OTHER INFORMATION: F183::(GGGGS)3::F183
<220> FEATURE:
<221> NAME/KEY: PEPTIDE
<222> LOCATION: (1)..(273)
<223> OTHER INFORMATION: F183::(GGGGS)3::F183

<400> SEQUENCE: 11

Gln Val Gln Leu Gln Glu Ser Gly Gly Gly Ser Val Gln Ala Gly Gly
 1               5                  10                  15

Ser Leu Arg Leu Ser Cys Ala Ala Ser Gly Tyr Thr Tyr Ser Ser Asn
                 20                  25                  30

Cys Met Ala Trp Phe Arg Gln Val Pro Gly Lys Glu Arg Glu Gly Val
             35                  40                  45

Ala Ser Ile Asn Thr Arg Gly Gly Ile Thr Tyr Tyr Ala Asp Ser Val
 50                  55                  60

Lys Gly Arg Phe Thr Ile Ser Arg Asp Asn Ala Lys Asn Thr Val Ser
 65                  70                  75                  80

Leu Gln Met Asn Ser Leu Lys Pro Glu Asp Thr Ala Thr Tyr Tyr Cys
                 85                  90                  95

Ala Ala Val Arg Glu Ala Thr Tyr Ser Asp Asn Arg Cys Ser Val Arg
                100                 105                 110

Ser Tyr Thr Tyr Asp Tyr Trp Gly Gln Gly Thr Gln Val Thr Val Ser
            115                 120                 125

Ser Gly Gly Gly Gly Ser Gly Gly Gly Gly Ser Gly Gly Gly Gly Ser
            130                 135                 140

Gln Val Gln Leu Gln Glu Ser Gly Gly Gly Ser Val Gln Ala Gly Gly
145                 150                 155                 160

Ser Leu Arg Leu Ser Cys Ala Ala Ser Gly Tyr Thr Tyr Ser Ser Asn
                165                 170                 175

Cys Met Ala Trp Phe Arg Gln Val Pro Gly Lys Glu Arg Glu Gly Val
            180                 185                 190

Ala Ser Ile Asn Thr Arg Gly Gly Ile Thr Tyr Tyr Ala Asp Ser Val
            195                 200                 205

Lys Gly Arg Phe Thr Ile Ser Arg Asp Asn Ala Lys Asn Thr Val Ser
            210                 215                 220

Leu Gln Met Asn Ser Leu Lys Pro Glu Asp Thr Ala Thr Tyr Tyr Cys
225                 230                 235                 240

Ala Ala Val Arg Glu Ala Thr Tyr Ser Asp Asn Arg Cys Ser Val Arg
                245                 250                 255

Ser Tyr Thr Tyr Asp Tyr Trp Gly Gln Gly Thr Gln Val Thr Val Ser
```

-continued

```
                260                 265                 270
Ser

<210> SEQ ID NO 12
<211> LENGTH: 281
<212> TYPE: PRT
<213> ORGANISM: Unknown
<220> FEATURE:
<223> OTHER INFORMATION: F183::IgG3::F183
<220> FEATURE:
<221> NAME/KEY: PEPTIDE
<222> LOCATION: (1)..(281)
<223> OTHER INFORMATION: F183::IgG3::F183

<400> SEQUENCE: 12

Gln Val Gln Leu Gln Glu Ser Gly Gly Gly Ser Val Gln Ala Gly Gly
1               5                   10                  15

Ser Leu Arg Leu Ser Cys Ala Ala Ser Gly Tyr Thr Tyr Ser Ser Asn
            20                  25                  30

Cys Met Ala Trp Phe Arg Gln Val Pro Gly Lys Glu Arg Glu Gly Val
        35                  40                  45

Ala Ser Ile Asn Thr Arg Gly Gly Ile Thr Tyr Tyr Ala Asp Ser Val
    50                  55                  60

Lys Gly Arg Phe Thr Ile Ser Arg Asp Asn Ala Lys Asn Thr Val Ser
65                  70                  75                  80

Leu Gln Met Asn Ser Leu Lys Pro Glu Asp Thr Ala Thr Tyr Tyr Cys
                85                  90                  95

Ala Ala Val Arg Glu Ala Thr Tyr Ser Asp Asn Arg Cys Ser Val Arg
            100                 105                 110

Ser Tyr Thr Tyr Asp Tyr Trp Gly Gln Gly Thr Gln Val Thr Val Ser
        115                 120                 125

Ser Val Asp Ile Glu Pro Pro Thr Pro Ile Cys Pro Glu Ile Cys Ser
    130                 135                 140

Cys Pro Ala Ala Glu Val Leu Gly Gln Val Gln Leu Gln Glu Ser Gly
145                 150                 155                 160

Gly Gly Ser Val Gln Ala Gly Gly Ser Leu Arg Leu Ser Cys Ala Ala
                165                 170                 175

Ser Gly Tyr Thr Tyr Ser Ser Asn Cys Met Ala Trp Phe Arg Gln Val
            180                 185                 190

Pro Gly Lys Glu Arg Glu Gly Val Ala Ser Ile Asn Thr Arg Gly Gly
        195                 200                 205

Ile Thr Tyr Tyr Ala Asp Ser Val Lys Gly Arg Phe Thr Ile Ser Arg
    210                 215                 220

Asp Asn Ala Lys Asn Thr Val Ser Leu Gln Met Asn Ser Leu Lys Pro
225                 230                 235                 240

Glu Asp Thr Ala Thr Tyr Tyr Cys Ala Ala Val Arg Glu Ala Thr Tyr
                245                 250                 255

Ser Asp Asn Arg Cys Ser Val Arg Ser Tyr Thr Tyr Asp Tyr Trp Gly
            260                 265                 270

Gln Gly Thr Gln Val Thr Val Ser Ser
        275                 280

<210> SEQ ID NO 13
<211> LENGTH: 265
<212> TYPE: PRT
<213> ORGANISM: Unknown
<220> FEATURE:
<223> OTHER INFORMATION: F45::(GGGGS)3::F45
```

<220> FEATURE:
<221> NAME/KEY: PEPTIDE
<222> LOCATION: (1)..(265)
<223> OTHER INFORMATION: F45::(GGGGS)3::F45

<400> SEQUENCE: 13

```
Gln Val Gln Leu Gln Glu Ser Gly Gly Gly Leu Val Gln Pro Gly Gly
1               5                   10                  15

Ser Leu Arg Leu Ser Cys Leu Val Ser Gly Gly Thr Phe Ser Trp Tyr
            20                  25                  30

Ala Met Gly Trp Phe Arg Gln Ala Pro Gly Lys Glu Arg Glu Phe Val
        35                  40                  45

Ala Thr Val Ser Arg Gly Gly Gly Ser Ser Tyr Tyr Ala Asp Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Gly Arg Gly Ala Pro Ser Asp Thr Gly Arg Pro Asp Glu Tyr
            100                 105                 110

Asp Tyr Trp Gly Gln Gly Thr Gln Val Thr Val Ser Ser Gly Gly Gly
        115                 120                 125

Gly Ser Gly Gly Gly Gly Ser Gly Gly Gly Gly Ser Gln Val Gln Leu
    130                 135                 140

Gln Glu Ser Gly Gly Gly Leu Val Gln Pro Gly Gly Ser Leu Arg Leu
145                 150                 155                 160

Ser Cys Leu Val Ser Gly Gly Thr Phe Ser Trp Tyr Ala Met Gly Trp
                165                 170                 175

Phe Arg Gln Ala Pro Gly Lys Glu Arg Glu Phe Val Ala Thr Val Ser
            180                 185                 190

Arg Gly Gly Gly Ser Ser Tyr Tyr Ala Asp Ser Val Lys Gly Arg Phe
        195                 200                 205

Thr Ile Ser Arg Asp Asn Ala Lys Asn Thr Val Tyr Leu Gln Met Asn
    210                 215                 220

Ser Leu Lys Pro Glu Asp Thr Ala Val Tyr Tyr Cys Ala Ala Gly Arg
225                 230                 235                 240

Gly Ala Pro Ser Asp Thr Gly Arg Pro Asp Glu Tyr Asp Tyr Trp Gly
                245                 250                 255

Gln Gly Thr Gln Val Thr Val Ser Ser
            260                 265
```

<210> SEQ ID NO 14
<211> LENGTH: 259
<212> TYPE: PRT
<213> ORGANISM: Unknown
<220> FEATURE:
<223> OTHER INFORMATION: Stx2e1::(GGGGS)3::Stx2e1
<220> FEATURE:
<221> NAME/KEY: PEPTIDE
<222> LOCATION: (1)..(259)
<223> OTHER INFORMATION: Stx2e1::(GGGGS)3::Stx2e1

<400> SEQUENCE: 14

```
Gln Val Gln Leu Gln Glu Ser Gly Gly Gly Leu Val Gln Ala Gly Gly
1               5                   10                  15

Ser Leu Arg Leu Ser Cys Ala Val Ser Gly Ser Ile Phe Arg Leu Ser
            20                  25                  30

Thr Met Gly Trp Tyr Arg Gln Ala Pro Gly Lys Gln Arg Glu Phe Val
```

```
                35                  40                  45
Ala Ser Ile Thr Ser Tyr Gly Asp Thr Asn Tyr Arg Asp Ser Val Lys
 50                  55                  60

Gly Arg Phe Thr Ile Ser Arg Asp Asn Ala Lys Asn Thr Val Tyr Leu
 65                  70                  75                  80

Gln Met Asn Ser Leu Lys Pro Glu Asp Thr Ala Val Tyr Tyr Cys Asn
                 85                  90                  95

Ala Asn Ile Glu Ala Gly Thr Tyr Tyr Gly Pro Gly Arg Asp Tyr Trp
            100                 105                 110

Gly Gln Gly Thr Gln Val Thr Val Ser Ser Gly Gly Gly Ser Gly
            115                 120                 125

Gly Gly Gly Ser Gly Gly Gly Ser Gln Val Gln Leu Gln Glu Ser
        130                 135                 140

Gly Gly Gly Leu Val Gln Ala Gly Gly Ser Leu Arg Leu Ser Cys Ala
145                 150                 155                 160

Val Ser Gly Ser Ile Phe Arg Leu Ser Thr Met Gly Trp Tyr Arg Gln
                165                 170                 175

Ala Pro Gly Lys Gln Arg Glu Phe Val Ala Ser Ile Thr Ser Tyr Gly
            180                 185                 190

Asp Thr Asn Tyr Arg Asp Ser Val Lys Gly Arg Phe Thr Ile Ser Arg
            195                 200                 205

Asp Asn Ala Lys Asn Thr Val Tyr Leu Gln Met Asn Ser Leu Lys Pro
210                 215                 220

Glu Asp Thr Ala Val Tyr Tyr Cys Asn Ala Asn Ile Glu Ala Gly Thr
225                 230                 235                 240

Tyr Tyr Gly Pro Gly Arg Asp Tyr Trp Gly Gln Gly Thr Gln Val Thr
                245                 250                 255

Val Ser Ser

<210> SEQ ID NO 15
<211> LENGTH: 265
<212> TYPE: PRT
<213> ORGANISM: Unknown
<220> FEATURE:
<223> OTHER INFORMATION: LT1::(GGGGS)3::LT1
<220> FEATURE:
<221> NAME/KEY: PEPTIDE
<222> LOCATION: (1)..(265)
<223> OTHER INFORMATION: LT1::(GGGGS)3::LT1

<400> SEQUENCE: 15

Gln Val Gln Leu Gln Gln Ser Gly Gly Gly Leu Val Gln Ala Gly Gly
  1               5                  10                  15

Ser Leu Arg Leu Ser Cys Ala Ala Ser Gly Phe Thr Phe Asp Asp Tyr
             20                  25                  30

Ala Ile Gly Trp Phe Arg Gln Ala Pro Gly Lys Glu Arg Glu Gly Ile
         35                  40                  45

Ser Ser Ile Val Gly Ser Asp Asn Tyr Thr Trp Tyr Thr Asp Ser Val
     50                  55                  60

Lys Gly Arg Phe Thr Ile Ser Ser Asp Asn Thr Arg Ser Thr Val Tyr
 65                  70                  75                  80

Leu Gln Met Asn Ser Leu Lys Pro Glu Asp Thr Ala Val Tyr Tyr Cys
                 85                  90                  95

Ala Ala Asp Ser Tyr Ser Asp Tyr Val Ser Leu Asn Pro Glu Thr Phe
            100                 105                 110

Gly Ser Trp Gly Gln Gly Thr Gln Val Thr Val Ser Ser Gly Gly Gly
```

```
                115                 120                 125
Gly Ser Gly Gly Gly Ser Gly Gly Gly Ser Gln Val Gln Leu
        130                 135                 140
Gln Gln Ser Gly Gly Gly Leu Val Gln Ala Gly Gly Ser Leu Arg Leu
145                 150                 155                 160
Ser Cys Ala Ala Ser Gly Phe Thr Phe Asp Asp Tyr Ala Ile Gly Trp
                165                 170                 175
Phe Arg Gln Ala Pro Gly Lys Glu Arg Glu Gly Ile Ser Ser Ile Val
                180                 185                 190
Gly Ser Asp Asn Tyr Thr Trp Tyr Thr Asp Ser Val Lys Gly Arg Phe
                195                 200                 205
Thr Ile Ser Ser Asp Asn Thr Arg Ser Thr Val Tyr Leu Gln Met Asn
        210                 215                 220
Ser Leu Lys Pro Glu Asp Thr Ala Val Tyr Tyr Cys Ala Ala Asp Ser
225                 230                 235                 240
Tyr Ser Asp Tyr Val Ser Leu Asn Pro Glu Thr Phe Gly Ser Trp Gly
                245                 250                 255
Gln Gly Thr Gln Val Thr Val Ser Ser
        260                 265

<210> SEQ ID NO 16
<211> LENGTH: 265
<212> TYPE: PRT
<213> ORGANISM: Unknown
<220> FEATURE:
<223> OTHER INFORMATION: F45::(GGGGS)3::LT1
<220> FEATURE:
<221> NAME/KEY: PEPTIDE
<222> LOCATION: (1)..(265)
<223> OTHER INFORMATION: F45::(GGGGS)3::LT1

<400> SEQUENCE: 16

Gln Val Gln Leu Gln Glu Ser Gly Gly Gly Leu Val Gln Pro Gly Gly
1               5                   10                  15
Ser Leu Arg Leu Ser Cys Leu Val Ser Gly Thr Phe Ser Trp Tyr
            20                  25                  30
Ala Met Gly Trp Phe Arg Gln Ala Pro Gly Lys Glu Arg Glu Phe Val
            35                  40                  45
Ala Thr Val Ser Arg Gly Gly Gly Ser Ser Tyr Tyr Ala Asp Ser Val
        50                  55                  60
Lys Gly Arg Phe Thr Ile Ser Arg Asp Asn Ala Lys Asn Thr Val Tyr
65                  70                  75                  80
Leu Gln Met Asn Ser Leu Lys Pro Glu Asp Thr Ala Val Tyr Tyr Cys
                85                  90                  95
Ala Ala Gly Arg Gly Ala Pro Ser Asp Thr Gly Arg Pro Asp Glu Tyr
            100                 105                 110
Asp Tyr Trp Gly Gln Gly Thr Gln Val Thr Val Ser Ser Gly Gly Gly
            115                 120                 125
Gly Ser Gly Gly Gly Gly Ser Gly Gly Gly Ser Gln Val Gln Leu
        130                 135                 140
Gln Gln Ser Gly Gly Gly Leu Val Gln Ala Gly Gly Ser Leu Arg Leu
145                 150                 155                 160
Ser Cys Ala Ala Ser Gly Phe Thr Phe Asp Asp Tyr Ala Ile Gly Trp
                165                 170                 175
Phe Arg Gln Ala Pro Gly Lys Glu Arg Glu Gly Ile Ser Ser Ile Val
                180                 185                 190
```

Gly Ser Asp Asn Tyr Thr Trp Tyr Thr Asp Ser Val Lys Gly Arg Phe
            195                 200                 205

Thr Ile Ser Ser Asp Asn Thr Arg Ser Thr Val Tyr Leu Gln Met Asn
            210                 215                 220

Ser Leu Lys Pro Glu Asp Thr Ala Val Tyr Tyr Cys Ala Ala Asp Ser
225                 230                 235                 240

Tyr Ser Asp Tyr Val Ser Leu Asn Pro Glu Thr Phe Gly Ser Trp Gly
                245                 250                 255

Gln Gly Thr Gln Val Thr Val Ser Ser
            260                 265

<210> SEQ ID NO 17
<211> LENGTH: 265
<212> TYPE: PRT
<213> ORGANISM: Unknown
<220> FEATURE:
<223> OTHER INFORMATION: LT1::(GGGGS)3::F45
<220> FEATURE:
<221> NAME/KEY: PEPTIDE
<222> LOCATION: (1)..(265)
<223> OTHER INFORMATION: LT1::(GGGGS)3::F45

<400> SEQUENCE: 17

Gln Val Gln Leu Gln Gln Ser Gly Gly Gly Leu Val Gln Ala Gly Gly
1               5                   10                  15

Ser Leu Arg Leu Ser Cys Ala Ala Ser Gly Phe Thr Phe Asp Asp Tyr
            20                  25                  30

Ala Ile Gly Trp Phe Arg Gln Ala Pro Gly Lys Glu Arg Glu Gly Ile
        35                  40                  45

Ser Ser Ile Val Gly Ser Asp Asn Tyr Thr Trp Tyr Thr Asp Ser Val
    50                  55                  60

Lys Gly Arg Phe Thr Ile Ser Ser Asp Asn Thr Arg Ser Thr Val Tyr
65                  70                  75                  80

Leu Gln Met Asn Ser Leu Lys Pro Glu Asp Thr Ala Val Tyr Tyr Cys
                85                  90                  95

Ala Ala Asp Ser Tyr Ser Asp Tyr Val Ser Leu Asn Pro Glu Thr Phe
            100                 105                 110

Gly Ser Trp Gly Gln Gly Thr Gln Val Thr Val Ser Ser Gly Gly Gly
        115                 120                 125

Gly Ser Gly Gly Gly Gly Ser Gly Gly Gly Gly Ser Gln Val Gln Leu
    130                 135                 140

Gln Glu Ser Gly Gly Gly Leu Val Gln Pro Gly Gly Ser Leu Arg Leu
145                 150                 155                 160

Ser Cys Leu Val Ser Gly Gly Thr Phe Ser Trp Tyr Ala Met Gly Trp
                165                 170                 175

Phe Arg Gln Ala Pro Gly Lys Glu Arg Glu Phe Val Ala Thr Val Ser
            180                 185                 190

Arg Gly Gly Gly Ser Ser Tyr Tyr Ala Asp Ser Val Lys Gly Arg Phe
        195                 200                 205

Thr Ile Ser Arg Asp Asn Ala Lys Asn Thr Val Tyr Leu Gln Met Asn
    210                 215                 220

Ser Leu Lys Pro Glu Asp Thr Ala Val Tyr Tyr Cys Ala Ala Gly Arg
225                 230                 235                 240

Gly Ala Pro Ser Asp Thr Gly Arg Pro Asp Glu Tyr Asp Tyr Trp Gly
                245                 250                 255

Gln Gly Thr Gln Val Thr Val Ser Ser
            260                 265

<210> SEQ ID NO 18
<211> LENGTH: 266
<212> TYPE: PRT
<213> ORGANISM: Unknown
<220> FEATURE:
<223> OTHER INFORMATION: F183::(GGGGS)3::Stx2e1
<220> FEATURE:
<221> NAME/KEY: PEPTIDE
<222> LOCATION: (1)..(266)
<223> OTHER INFORMATION: F183::(GGGGS)3::Stx2e1

<400> SEQUENCE: 18

Gln Val Gln Leu Gln Glu Ser Gly Gly Gly Ser Val Gln Ala Gly Gly
1 5 10 15

Ser Leu Arg Leu Ser Cys Ala Ala Ser Gly Tyr Thr Tyr Ser Ser Asn
20 25 30

Cys Met Ala Trp Phe Arg Gln Val Pro Gly Lys Glu Arg Glu Gly Val
35 40 45

Ala Ser Ile Asn Thr Arg Gly Gly Ile Thr Tyr Tyr Ala Asp Ser Val
50 55 60

Lys Gly Arg Phe Thr Ile Ser Arg Asp Asn Ala Lys Asn Thr Val Ser
65 70 75 80

Leu Gln Met Asn Ser Leu Lys Pro Glu Asp Thr Ala Thr Tyr Tyr Cys
85 90 95

Ala Ala Val Arg Glu Ala Thr Tyr Ser Asp Asn Arg Cys Ser Val Arg
100 105 110

Ser Tyr Thr Tyr Asp Tyr Trp Gly Gln Gly Thr Gln Val Thr Val Ser
115 120 125

Ser Gly Gly Gly Gly Ser Gly Gly Gly Gly Ser Gly Gly Gly Gly Ser
130 135 140

Gln Val Gln Leu Gln Glu Ser Gly Gly Gly Leu Val Gln Ala Gly Gly
145 150 155 160

Ser Leu Arg Leu Ser Cys Ala Val Ser Gly Ser Ile Phe Arg Leu Ser
165 170 175

Thr Met Gly Trp Tyr Arg Gln Ala Pro Gly Lys Gln Arg Glu Phe Val
180 185 190

Ala Ser Ile Thr Ser Tyr Gly Asp Thr Asn Tyr Arg Asp Ser Val Lys
195 200 205

Gly Arg Phe Thr Ile Ser Arg Asp Asn Ala Lys Asn Thr Val Tyr Leu
210 215 220

Gln Met Asn Ser Leu Lys Pro Glu Asp Thr Ala Val Tyr Tyr Cys Asn
225 230 235 240

Ala Asn Ile Glu Ala Gly Thr Tyr Tyr Gly Pro Gly Arg Asp Tyr Trp
245 250 255

Gly Gln Gly Thr Gln Val Thr Val Ser Ser
260 265

<210> SEQ ID NO 19
<211> LENGTH: 266
<212> TYPE: PRT
<213> ORGANISM: Unknown
<220> FEATURE:
<223> OTHER INFORMATION: Stx2e1::(GGGGS)3::F183
<220> FEATURE:
<221> NAME/KEY: PEPTIDE
<222> LOCATION: (1)..(266)
<223> OTHER INFORMATION: Stx2e1::(GGGGS)3::F183

<400> SEQUENCE: 19

```
Gln Val Gln Leu Gln Glu Ser Gly Gly Gly Leu Val Gln Ala Gly Gly
1               5                   10                  15

Ser Leu Arg Leu Ser Cys Ala Val Ser Gly Ser Ile Phe Arg Leu Ser
            20                  25                  30

Thr Met Gly Trp Tyr Arg Gln Ala Pro Gly Lys Gln Arg Glu Phe Val
        35                  40                  45

Ala Ser Ile Thr Ser Tyr Gly Asp Thr Asn Tyr Arg Asp Ser Val Lys
    50                  55                  60

Gly Arg Phe Thr Ile Ser Arg Asp Asn Ala Lys Asn Thr Val Tyr Leu
65                  70                  75                  80

Gln Met Asn Ser Leu Lys Pro Glu Asp Thr Ala Val Tyr Tyr Cys Asn
                85                  90                  95

Ala Asn Ile Glu Ala Gly Thr Tyr Tyr Gly Pro Gly Arg Asp Tyr Trp
            100                 105                 110

Gly Gln Gly Thr Gln Val Thr Val Ser Ser Gly Gly Gly Gly Ser Gly
        115                 120                 125

Gly Gly Gly Ser Gly Gly Gly Gly Ser Gln Val Gln Leu Gln Glu Ser
    130                 135                 140

Gly Gly Gly Ser Val Gln Ala Gly Gly Ser Leu Arg Leu Ser Cys Ala
145                 150                 155                 160

Ala Ser Gly Tyr Thr Tyr Ser Ser Asn Cys Met Ala Trp Phe Arg Gln
            165                 170                 175

Val Pro Gly Lys Glu Arg Glu Gly Val Ala Ser Ile Asn Thr Arg Gly
        180                 185                 190

Gly Ile Thr Tyr Tyr Ala Asp Ser Val Lys Gly Arg Phe Thr Ile Ser
    195                 200                 205

Arg Asp Asn Ala Lys Asn Thr Val Ser Leu Gln Met Asn Ser Leu Lys
210                 215                 220

Pro Glu Asp Thr Ala Thr Tyr Tyr Cys Ala Ala Val Arg Glu Ala Thr
225                 230                 235                 240

Tyr Ser Asp Asn Arg Cys Ser Val Arg Ser Tyr Thr Tyr Asp Tyr Trp
            245                 250                 255

Gly Gln Gly Thr Gln Val Thr Val Ser Ser
        260                 265

<210> SEQ ID NO 20
<211> LENGTH: 5
<212> TYPE: PRT
<213> ORGANISM: Artificial sequence
<220> FEATURE:
<223> OTHER INFORMATION: GGGGS linker
<220> FEATURE:
<221> NAME/KEY: PEPTIDE
<222> LOCATION: (1)..(5)
<223> OTHER INFORMATION: GGGGS linker

<400> SEQUENCE: 20

Gly Gly Gly Gly Ser
1               5

<210> SEQ ID NO 21
<211> LENGTH: 10
<212> TYPE: PRT
<213> ORGANISM: Artificial sequence
<220> FEATURE:
<223> OTHER INFORMATION: (GGGGS)2 linker
<220> FEATURE:
<221> NAME/KEY: PEPTIDE
<222> LOCATION: (1)..(10)
```

<223> OTHER INFORMATION: (GGGGS)2 linker

<400> SEQUENCE: 21

Gly Gly Gly Gly Ser Gly Gly Gly Gly Ser
1               5                   10

<210> SEQ ID NO 22
<211> LENGTH: 15
<212> TYPE: PRT
<213> ORGANISM: Artificial sequence
<220> FEATURE:
<223> OTHER INFORMATION: (GGGGS)3 linker
<220> FEATURE:
<221> NAME/KEY: PEPTIDE
<222> LOCATION: (1)..(15)
<223> OTHER INFORMATION: (GGGGS)3 linker

<400> SEQUENCE: 22

Gly Gly Gly Gly Ser Gly Gly Gly Gly Ser Gly Gly Gly Gly Ser
1               5                   10                  15

<210> SEQ ID NO 23
<211> LENGTH: 20
<212> TYPE: PRT
<213> ORGANISM: Artificial sequence
<220> FEATURE:
<223> OTHER INFORMATION: (GGGGS)4 linker
<220> FEATURE:
<221> NAME/KEY: PEPTIDE
<222> LOCATION: (1)..(20)
<223> OTHER INFORMATION: (GGGGS)4 linker

<400> SEQUENCE: 23

Gly Gly Gly Gly Ser Gly Gly Gly Gly Ser Gly Gly Gly Gly Ser Gly
1               5                   10                  15

Gly Gly Gly Ser
            20

<210> SEQ ID NO 24
<211> LENGTH: 25
<212> TYPE: PRT
<213> ORGANISM: Artificial sequence
<220> FEATURE:
<223> OTHER INFORMATION: (GGGGS)5 linker
<220> FEATURE:
<221> NAME/KEY: PEPTIDE
<222> LOCATION: (1)..(25)
<223> OTHER INFORMATION: (GGGGS)5 linker

<400> SEQUENCE: 24

Gly Gly Gly Gly Ser Gly Gly Gly Gly Ser Gly Gly Gly Gly Ser Gly
1               5                   10                  15

Gly Gly Gly Ser Gly Gly Gly Gly Ser
            20                  25

<210> SEQ ID NO 25
<211> LENGTH: 30
<212> TYPE: PRT
<213> ORGANISM: Artificial sequence
<220> FEATURE:
<223> OTHER INFORMATION: (GGGGS)6 linker
<220> FEATURE:
<221> NAME/KEY: PEPTIDE
<222> LOCATION: (1)..(30)
<223> OTHER INFORMATION: (GGGGS)6 linker

<400> SEQUENCE: 25

Gly Gly Gly Gly Ser Gly Gly Gly Gly Ser Gly Gly Gly Gly Ser Gly

```
                1               5                  10                 15
Gly Gly Gly Ser Gly Gly Gly Ser Gly Gly Gly Ser
                20                 25                 30

<210> SEQ ID NO 26
<211> LENGTH: 23
<212> TYPE: PRT
<213> ORGANISM: Artificial sequence
<220> FEATURE:
<223> OTHER INFORMATION: IgG3 linker
<220> FEATURE:
<221> NAME/KEY: PEPTIDE
<222> LOCATION: (1)..(23)
<223> OTHER INFORMATION: IgG3 linker

<400> SEQUENCE: 26

Val Asp Ile Glu Pro Pro Thr Pro Ile Cys Pro Glu Ile Cys Ser Cys
1               5                   10                  15

Pro Ala Ala Glu Val Leu Gly
            20

<210> SEQ ID NO 27
<211> LENGTH: 7
<212> TYPE: PRT
<213> ORGANISM: Unknown
<220> FEATURE:
<223> OTHER INFORMATION: LT1 CDR1
<220> FEATURE:
<221> NAME/KEY: PEPTIDE
<222> LOCATION: (1)..(7)
<223> OTHER INFORMATION: LT1 CDR1

<400> SEQUENCE: 27

Phe Thr Phe Asp Asp Tyr Ala
1               5

<210> SEQ ID NO 28
<211> LENGTH: 9
<212> TYPE: PRT
<213> ORGANISM: Unknown
<220> FEATURE:
<223> OTHER INFORMATION: F45 CDR1
<220> FEATURE:
<221> NAME/KEY: PEPTIDE
<222> LOCATION: (1)..(9)
<223> OTHER INFORMATION: F45 CDR1

<400> SEQUENCE: 28

Gly Thr Phe Ser Trp Tyr Ala Met Gly
1               5

<210> SEQ ID NO 29
<211> LENGTH: 9
<212> TYPE: PRT
<213> ORGANISM: Unknown
<220> FEATURE:
<223> OTHER INFORMATION: LT1 CDR2
<220> FEATURE:
<221> NAME/KEY: PEPTIDE
<222> LOCATION: (1)..(9)
<223> OTHER INFORMATION: LT1 CDR2

<400> SEQUENCE: 29

Ser Ile Val Gly Ser Asp Asn Tyr Thr
1               5

<210> SEQ ID NO 30
<211> LENGTH: 11
```

```
<212> TYPE: PRT
<213> ORGANISM: Unknown
<220> FEATURE:
<223> OTHER INFORMATION: F45 CDR2
<220> FEATURE:
<221> NAME/KEY: PEPTIDE
<222> LOCATION: (1)..(11)
<223> OTHER INFORMATION: F45 CDR2

<400> SEQUENCE: 30

Thr Val Ser Arg Gly Gly Gly Ser Ser Tyr Tyr
1               5                   10

<210> SEQ ID NO 31
<211> LENGTH: 18
<212> TYPE: PRT
<213> ORGANISM: Unknown
<220> FEATURE:
<223> OTHER INFORMATION: LT1 CDR3
<220> FEATURE:
<221> NAME/KEY: PEPTIDE
<222> LOCATION: (1)..(18)
<223> OTHER INFORMATION: LT1 CDR3

<400> SEQUENCE: 31

Ala Ala Asp Ser Tyr Ser Asp Tyr Val Ser Leu Asn Pro Glu Thr Phe
1               5                   10                  15

Gly Ser

<210> SEQ ID NO 32
<211> LENGTH: 18
<212> TYPE: PRT
<213> ORGANISM: Unknown
<220> FEATURE:
<223> OTHER INFORMATION: F45 CDR3
<220> FEATURE:
<221> NAME/KEY: PEPTIDE
<222> LOCATION: (1)..(18)
<223> OTHER INFORMATION: F45 CDR3

<400> SEQUENCE: 32

Gly Arg Gly Ala Pro Ser Asp Thr Gly Arg Pro Asp Glu Tyr Asp Tyr
1               5                   10                  15

Trp Gly
```

PATHOGEN BINDING PROTEINS

CROSS REFERENCE TO RELATED APPLICATIONS

This application is a U.S. National Stage under 35 U.S.C. § 371 of International Patent Application number PCT/EP2020/050183, which depends from and claims priority to International Patent Application No PCT/DK2019/050004 filed Jan. 7, 2019 and European Application No: 19201645.9 filed Oct. 7, 2019, the entire contents of each of which are incorporated herein by reference.

TECHNICAL FIELD

The present invention relates to proteins, compositions and their use, in particular proteins and compositions. The protein comprises a first peptide having a first binding specificity, a second peptide having a second binding specificity and a linker, wherein said first and said second peptides bind at least one pathogen surface component and/or at least one molecule produced by a pathogen. The proteins and/or compositions are thus useful for the prevention or treatment of an infection caused by a pathogen.

BACKGROUND

The article by Harmsen et al. 2006 (Selection and optimization of proteolytically stable llama single-domain antibody fragments for oral immunotherapy) concerns oral application of the recombinant single-domain antibody ($V_HH$ fragment) clone K609. K609 is directed against *Escherichia coli* F4 fimbriae, more specifically the tip-adhesin FaeG, and has been shown to reduce *E. coli*-induced diarrhoea in piglets, but only at high doses, as orally applied K609 single-domain antibody is proteolytically degraded in the stomach. By selection and DNA shuffling, four clones with increased in vitro stability were obtained. These single-domain antibodies differed by at most ten amino acid residues from each other and K609. The most stable clone, K922, retained 41% activity after incubation in gastric fluid and 90% in jejunal fluid and in addition showed higher affinity for FaeG compared to the original K609 clone.

The article by Virdi et al. 2013 (Orally fed seeds producing designer IgAs protect weaned piglets against enterotoxigenic *Escherichia coli* infection) concerns oral feed-based passive immunization against postweaning infections, for example Enterotoxigenic *Escherichia coli* (ETEC)-caused postweaning diarrhoea in piglets. Anti-F4$^+$ETEC antibodies against ETEC, were designed by fusing variable domains of llama heavy chain-only antibodies to the Fc part of a porcine immunoglobin (IgG or IgA) and expressing them in *Arabidopsis thaliana* seeds. The article also describes $V_HH$-IgA-based monomeric, dimeric and secretory IgA.

The article by Lo et al. 2014 (The molecular Mechanism of Shiga Toxin stx2e Neutralization by Single-domain Antibody Targeting the Cell Receptor-binding Domain) reports the discovery and characterization of a single-domain antibody, isolated from a llama phage display library that confers potent neutralizing capacity against Stx2e toxin. Edema disease is a severe disease characterized by neurological disorders, hemorrhagic lesions, and frequent fatal outcome. Swine edema disease is caused by Shiga toxin Stx2e-producing *Escherichia coli*. The article suggests that the neutralizing NbStx2e1 can be used to prevent or treat edema disease in pigs in the future.

The article by Moonens et al. 2014 (Nanobody Mediated Inhibition of Attachment of F18 Fimbriae Expressing *Escherichia coli*) concerns nanobodies directed against the lectin domain of the F18 fimbrial adhesin FedF. These FedF binding nanobodies are obtained from llamas.

The patent application WO 2014/033313 A1 describes an invention relating to an antibody that can protect against ETEC infection in a passive immunization set up. An anti-ETEC single-domain antibody is fused to an IgA Fc domain and produced in plant seeds. This patent application is further related to the anti-ETEC being an anti-F4$^+$ ETEC single-domain antibody and an anti-F18$^+$ ETEC single-domain antibody.

SUMMARY

Herein is provided a protein comprising a first peptide having a first binding specificity, a second peptide having a second binding specificity and a linker, wherein said first and said second peptides bind at least one pathogen surface component and/or at least one molecule, such as a toxin, produced by a pathogen. The protein provided herein is useful for the prevention and/or treatment of pathogen-induced infections.

In one aspect, the present invention provides an isolated nucleic acid molecule encoding a protein according to the above aspect.

In another aspect, the present invention provides a vector comprising a nucleic acid molecule according to the above aspect.

In another aspect, the present invention provides a recombinant host cell comprising a nucleic acid molecule or a vector according to the above aspects.

In one aspect, the present invention provides a dietary composition comprising a protein according to the above aspects and optionally further comprising one or more of prebiotics, probiotics, synbiotics, proteins, lipids, carbohydrates, vitamins, fibers, and/or nutrients, such as dietary minerals for a living subject.

In one aspect, the present invention provides a pharmaceutical composition comprising a protein, a nucleic acid, a vector and/or a recombinant host cell according to the above aspects and optionally one or more pharmaceutically acceptable excipient.

In another aspect, the present invention provides a protein, a nucleic acid, a vector, a recombinant host cell or a pharmaceutical composition according to the above aspects for use as a medicament.

In one aspect, the present invention provides a protein, a nucleic acid, a vector, a recombinant host cell or a pharmaceutical composition according to the above aspects for use in the prevention or treatment of a pathogen induced infection associated with an internal and/or external surface.

In another aspect, the present invention provides a protein, a nucleic acid, a vector, a recombinant host cell or a pharmaceutical composition according to the above aspects for use in the prevention or treatment of gastrointestinal infections and/or pulmonary infections.

In another aspect, the present invention provides a protein wherein said protein comprises a first and a second peptide each comprise three complementary determining regions CDR1, CDR2 and CDR3.

In one aspect, the present invention provides a method of crosslinking pathogens, the method comprising administering a therapeutically effective amount of a protein, a dietary composition and/or a pharmaceutical composition according to any one of the above aspects to the subject.

In one aspect, the present invention provides a method of preventing biofilm, the method comprising administering a therapeutically effective amount of a protein, a dietary composition and/or a pharmaceutical composition according to any one of the above aspects to the subject.

In one aspect, the present invention provides a method of neutralizing a pathogen and/or a molecule secreted by a pathogen, the method comprising administering a therapeutically effective amount of a protein, a dietary composition and/or a pharmaceutical composition according to any one of the above aspects to the subject.

In one aspect, the present invention provides a method of treating or preventing infection caused by a pathogen such as gastrointestinal infections and/or pulmonary infections in subject in need thereof, the method comprising administering a therapeutically effective amount of a protein, a dietary composition and/or a pharmaceutical composition according to any one of the above aspects to the subject.

In another aspect, the present invention provides a method for producing a protein according to any one of the above aspects, the method comprising culturing a host cell as defined in any of the above aspects under conditions which permit expression of the encoded protein.

According to an aspect, the invention provides a protein comprising at least two single-domain antibodies, wherein said protein is specific for at least a first virulence factor and a second virulence factor.

According to another aspect, the invention provides a composition comprising the protein of the invention, and optionally one or more excipients, diluents and/or binders. According to an aspect, the invention provides a composition comprising a first single-domain antibody, which is specific for a first virulence factor, and a second single-domain antibody, which is specific for a second virulence factor.

According to an aspect, the invention provides a method of treating or preventing a medical condition in animals or humans, comprising administration of a protein or composition according to the invention.

According to an aspect, the invention provides a non-therapeutic use of a protein or composition according to the invention.

DESCRIPTION OF DRAWINGS

FIG. 13: Results from stability tests under conditions similar to those in the gastrointestinal tract are visualised on standard SDS gels. Bands of product are marked by an arrow.

Figure 1:
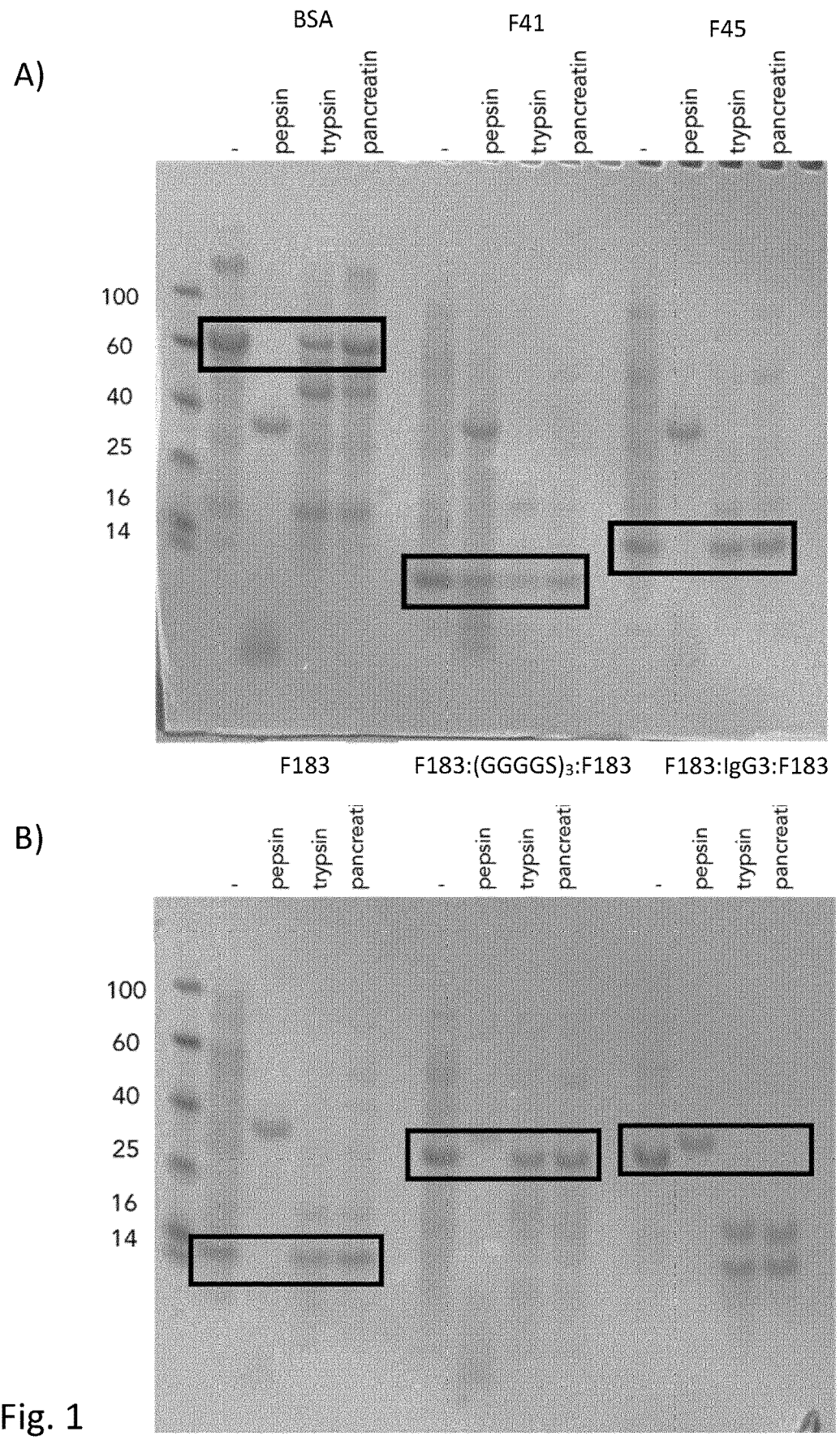
FIG. 1: Results from stability tests under conditions similar to those in the gastrointestinal tract are visualised on standard SDS gels. Bands of product are marked by a box.

All cited references are incorporated by reference.

The accompanying Figures and Examples are provided to explain rather than limit the present invention. It will be clear to the person skilled in the art that aspects, embodiments, claims, and any items of the present invention may be combined.

Unless otherwise mentioned, all percentages are in weight/weight. Unless otherwise mentioned, all measurements are conducted under standard conditions (ambient temperature and pressure). Unless otherwise mentioned, test conditions are according to European Pharmacopoeia 8.0.

DETAILED DESCRIPTION

The terms used in this specification generally have their ordinary meanings in the art, within the context of this present disclosure and in the specific context where each term is used. Certain terms are discussed below, or elsewhere in the specification, to provide additional guidance to the practitioner in describing the compositions and methods of the present disclosure and how to make and use them.

Definitions

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

The term "subject" as used herein refers to any subject, such as a human or animal subject. Non-limiting examples hereof can be mammal subjects and/or livestock. An "effective amount" of an agent refers to an amount effective, at dosages and for periods of time necessary, to achieve the desired therapeutic or prophylactic result.

As used herein, the term "in combination" refers to the use of more than one therapeutic agent. The use of the term "in combination" does not restrict the order in which the therapeutic agents are administered to a subject. A first therapeutic agent can be administered prior to, concomitantly with, or subsequent to the administration of a second therapeutic agent to a subject.

As used herein, "treatment" (and grammatical variations thereof such as "treat" or "treating") refers to intervention in an attempt to alter the natural course of the individual being treated in an amount, manner, and/or mode effective to improve a condition, symptom or parameter associated with a disease or to prevent progression of a disease, to either a statistically significant degree or to a degree detectable to one skilled in the art. The treatment may improve, cure, or decrease duration of, the disease or condition in the subject.

The term "monomer" or "monomeric protein" as used herein refers to a single peptide having a single binding specificity.

The term "divalent protein construct" as used herein refers to a protein comprising a first peptide having a first binding specificity and a second peptide having a second binding specificity connected by a linker.

The term "homovalent protein construct" as used herein refers to a protein comprising a first peptide having a first binding specificity and a second peptide having a second binding specificity connected by a linker, wherein the peptides are the same. The "homovalent protein construct" can also be denoted "bivalent construct" herein. Accordingly, both terms can be used interchangeably herein.

The term "heterodivalent protein construct" as used herein refers to a protein comprising a first peptide having a first binding specificity and a second peptide having a second binding specificity connected by a linker. The peptides are different. The "heterodivalent protein construct" can also be denoted "heterovalent" herein. Accordingly, both terms can be used interchangeably herein.

The term "surface components" as used herein refers to any surface component present on the surface of a pathogen, such as any cell-surface component present on a surface of a pathogen. Thus, the cell surface component may be, but is not limited to, an adhesion factor.

The term "molecule" as used herein refers to any molecule produced by a pathogen. The molecule can be a secreted molecule or a molecule attached to a cell or a surface. In some embodiments of the present invention, the molecule is a toxin, a protease and/or binding molecule. In some embodiments of the present invention, the molecule is an inhibitor, which can bind to a pharmaceutical component and hereby inhibit the function of the pharmaceutical component.

Properties of the Protein

The present disclosure relates to a protein comprising
a first peptide having a first binding specificity;
a second peptide having a second binding specificity; and
a linker,
wherein said first and said second peptides bind at least one pathogen surface component and/or at least one molecule produced by a pathogen.

The protein of the present disclosure is usually an isolated protein, i.e. it is not located or otherwise provided within a cell, such as a cell within a living subject.

In embodiments of the present invention, the protein may comprise one or more further peptides binding to at least one pathogen surface component and/or at least one molecule produced by a pathogen.

Single-domain antibodies, i.e. monomers are normally proteolytically degraded in the stomach. Thus, only very high amounts of single-domain antibodies may have an effect in the gastrointestinal tract. Surprisingly, the inventors found that by linking at least two peptides, with a linker according to the present invention, they found that the protein construct was stable in the gastrointestinal tract. Interestingly, the inventors furthermore found that the protein was able to bind to a pathogen surface component and/or molecule secreted by a pathogen. Thus, the present inventors have generated a protein that effectively prevents and/or treats pathogen-induced infections, crosslinks pathogens, prevents biofilm formation and/or neutralizes molecules secreted by pathogens.

Properties of the Linker

The linker according to the present invention refers to a linker that facilitates at least dimerization. Thus, the invention concerns a protein, wherein said first and said second peptides are linked by a linker.

In embodiments of the present invention, the linker is a stable linker and confers stability to the protein of the invention. Thus, upon exposures as described herein below, said linker is not degraded and hence is capable of linking said first and said second peptide of the present invention. It is preferred that the protein is stable in the gastrointestinal tract and/or respiratory system of a subject, i.e. the linker is capable of facilitating at least dimerization of the protein in the gastrointestinal tract and/or respiratory system of a subject. In one embodiment, the protein is acid stable and/or protease stable. The protein may be stable in the presence of any acids, such as bile acid and/or citric acid. The protein is also preferably stable in the presence of any proteases, such as pepsin and/or trypsin. In one embodiment, the protein is stable in the presence of gall, such as 50%, 10% or 2% gall for 1 hour. In another embodiment, the protein is stable in the presence of a bile salt, such as 0.2 mM, 1 mM and 10 mM sodium deoxycholate (NaDeox) for 1 hour.

In one embodiment of the present invention, the protein is temperature stable, such as temperature stable until 70° C. This indicates high protein stability. In another embodiment, the protein is pH stable. Unexpectedly, the inventors found that, at pH 3-4, approx. 70-90% of the protein remained stable, thus said protein is able to pass through the gastrointestinal tract as at least a dimeric protein and retain its activity.

According to an embodiment, the invention concerns a protein, wherein a first and a second peptides are linked together through a linker.

In some embodiments of the present invention, said first and said second peptides are linked by a GS linker.

One non-limiting example hereof is at least two single-domain antibodies linked together through a GS linker. A GS linker is a fusion protein linker, consisting primarily of stretches of Glycine and Serine residues.

According to an embodiment, the invention concerns the protein, wherein said GS linker is a linker of the structure $(G_xS)_n$ where x refers to a number of consecutive G's where x may be between 1-10, such as 1, preferably 2, more preferred 3, preferably 4, preferably 5, more preferred 6, preferably 7, preferably 8, more preferred 9, preferably 10. n refers to a number of repeats of the $G_xS$ sequence where n may be between 1-10, such as 1, preferably 2, more preferred 3, preferably 4, preferably 5, more preferred 6, preferably 7, preferably 8, more preferred 9, preferably 10. Examples include but are not limited to a GGGGS linker (SEQ ID NO: 20), a GGGGSGGGGS linker (SEQ ID NO: 21), a GGGGSGGGGSGGGGS linker (SEQ ID NO: 22), a GGGGSGGGGSGGGGSGGGGS linker (SEQ ID NO: 23), a GGGGSGGGGSGGGGSGGGGSGGGGS linker (SEQ ID NO: 24), or a GGGGSGGGGSGGGGSGGGGSGGGGSGGGGS linker (SEQ ID NO: 25).

In one embodiment the GS linker is a GGGGSGGGGSGGGGS (SEQ ID NO: 22) linker.

The inventors have found that a protein comprising two monomers linked by an IgG3 linker was not stable after addition of proteases, such as pepsin and trypsin (see Example 6). Upon addition of proteases, the IgG3 linker was degraded, and the two monomers were no longer linked.

According to one embodiment, it is preferred that said first and said second peptides of the present invention are not linked by an IgG3 linker. Thus, said first and said second peptides may be linked by any stable linker, with the proviso that the linker is not an IgG3 linker, such as an IgG3 hinge linker of SEQ ID NO:26.

Previous studies have linked variable domains of llama heavy chain-only antibodies to an Fc part of a porcine immunoglobin (IgG or IgA), the drawback of such a construct is that it may lead to a unwanted immune responses in the treated subject.

Hence, according to another embodiment of the present invention, it is preferred that the linker does not comprise a part of an antibody, such as an Fc region or a part of an Fc region. Thus, said first and said second peptides may be linked by any stable linker, with the proviso that the linker does not comprise a part of an antibody, such as an Fc region or a part of an Fc region.

A pathogen surface component may be any component present on the surface of pathogen. Thus, it may include, but is not limited to, any virulence factors, such as adhesion factors.

Properties of the Peptides

The first and/or said second peptide can be any peptide having a binding specificity for a pathogen surface component and/or a molecule produced by a pathogen.

A pathogen surface component may be any component present on the surface of a pathogen. Thus, a pathogen surface component may be a pathogen appendage and/or virulence factor, such as an adhesion factor.

The molecule according to the present invention may be a toxin, an inhibitor and/or an enzyme.

Some pathogens are capable of producing enzymes to protect themselves, i.e. resulting in e.g. antimicrobial resistance, such as bacterial antibiotic resistance. These secreted molecules may be proteases or other molecules directed against an antibiotic or an inhibitor, which is able to bind to and neutralize the antibiotic. Thus, proteins directed against such molecules, can neutralize pathogen antibiotic resistance.

In one embodiment, the molecule produced by the pathogen is a betalactamase.

Preferably said first and said second peptides bind with a very low affinity to non-pathogen surface components and/or molecules secreted by a non-pathogen. A non-limiting example hereof may be that when the protein is provided to a human subject, the protein has a low binding specificity for human surface components (non-pathogen surface components).

In one embodiment of the present invention, the first and/or second peptide is a single-domain antibody. In another embodiment, the protein is a DARPin.

According to an embodiment, the invention concerns the protein, wherein said protein is homodivalent or heterodivalent.

The protein according to the present invention comprises said first and said second peptides, which may bind to:
the same surface component;
different surface components;
a surface component and a molecule;
the same molecule; or
different molecules.

In one embodiment the surface components are from the same pathogens.

In one embodiment the surface components are from different pathogens.

In one embodiment, the protein according to the invention is capable of crosslinking pathogens.

In one aspect of the present invention, wherein said first and said second peptides bind to the same pathogen surface component, the protein is capable of crosslinking pathogens expressing the same surface component, such as the same pathogen species. In another aspect of the present invention, wherein said first and said second peptides bind to the same pathogen surface component, the protein is able to neutralize adhesion of the pathogen and/or immobilize the pathogen.

In one aspect of the present invention, wherein said first and said second peptides bind to different pathogen surface components, the protein is capable of crosslinking pathogens expressing different surface components, such as crosslinking different pathogen species, or crosslinking different pathogen surface components present on the same pathogen species. In another aspect of the present invention, wherein said first and said second peptides bind to different pathogen surface components, the protein is able to neutralize adhesion of the pathogen(s) and/or immobilize the pathogen(s).

In one embodiment, the protein is capable of crosslinking F4+ ETEC bacteria.

In another embodiment, the protein according to the invention is capable of neutralizing a pathogen and/or a molecule produced by a pathogen.

In one aspect of the present invention, wherein said first and said second peptides bind to a pathogen surface component and a molecule secreted by a pathogen, the protein is able to crosslink the molecule to the pathogen, such as neutralizing toxins secreted from a pathogen.

In one aspect of the present invention, wherein said first and said second peptides bind to the same molecule, the protein is capable of neutralizing the molecules such as neutralize the effects of secreted toxins and/or secreted proteases.

In one aspect of the present invention, wherein said first and said second peptides bind to different molecules, the protein is capable of neutralizing at least two different molecules such as neutralize the effects of secreted toxins and/or secreted proteases, potentially in combination.

In another embodiment, the protein according to the invention is capable of preventing biofilm formation.

In one embodiment, the protein in dimeric form has an increased binding affinity compared to a monomeric protein. For example, the binding affinity of a homodimeric protein construct comprising two identical single-domain antibodies is at least 1.5 times higher than that of the monomeric single-domain antibody alone.

In one embodiment, one of said first or said second peptide binds to Escherichia coli bacteria, such as F4+ Escherichia coli bacteria and/or F18+ Escherichia coli bacteria.

In one embodiment, one of said first or said second peptide binds to F4+ Escherichia coli bacteria and wherein the other peptide binds F18+ Escherichia coli bacteria. In one embodiment, said surface component is selected from the group consisting of F18+, F4+, Stx2e, LT and animal and human variants of these According to an embodiment, the invention concerns a protein comprising at least two single-domain antibodies, wherein said protein is specific for at least a first virulence factor and a second virulence factor.

Virulence factors are molecules that are produced by and/or are being a part of microorganisms and evoke disease.

A single-domain antibody is also known as a "$V_HH$ fragment". A single-domain antibody is an antibody fragment consisting of a single monomeric variable antibody domain. Like a whole antibody, it is able to bind selectively to a specific antigen. With a molecular weight of only 12-15 kDa, single-domain antibodies are much smaller than common immunoglobulin G antibodies (150-160 kDa), which are composed of two heavy protein chains and two light chains. The single-domain antibodies are even smaller than Fab fragments (~50 kDa, one light chain and half a heavy chain) and single-chain variable fragments (~25 kDa, two variable domains, one from a light and one from a heavy chain). The first single-domain antibodies were engineered from heavy-chain antibodies found in camelids; these are called $V_HH$ fragments.

$V_HH$s may be derived from camelid heavy chain antibodies and are naturally devoid of light chains.

The term "single-domain antibody construct" refers to at least one single-domain antibody connected to at least one other single-domain antibody or peptide through a linker.

The terms "nanobody" refers to single-domain antibodies derived from natural sources such as a camel, llama, or shark, selected and optimized for further use.

According to an embodiment, the invention concerns a protein, wherein said second virulence factor is identical to or different from said first virulence factor.

According to an embodiment, the invention concerns the protein, wherein said protein comprises a first single-domain antibody, which is specific for said first virulence factor and a second single-domain antibody, which is specific for said second virulence factor.

By "is specific for", it is generally meant that a single-domain antibody binds to an epitope and that the binding entails some complementarity. According to this definition, a single-domain antibody is said to "specifically bind" to an epitope when it binds to that epitope more readily than it would bind to a random, unrelated epitope. The term "specificity" is used herein to qualify the relative affinity by which a certain single-domain antibody binds to a certain epitope.

As used herein, a protein that "is specific for a virulence factor" refers to a protein that binds to a virulence factor with a $K_d$ of $5 \times 10^{-7}$ M or less, $1 \times 10^{-7}$ M or less, $5 \times 10^{-8}$ M or less, $1 \times 10^{-8}$ M or less, $5 \times 10^{-9}$ M or less, $1 \times 10^{-9}$ M or less, $5 \times 10^{-10}$ M or less, $1 \times 10^{-10}$ M or less, $5 \times 10^{-11}$ M or less, or $1 \times 10^{-11}$ M or less. In certain embodiments, the protein binds with a $K_d$ of $1 \times 10^{-8}$ M-$1 \times 10^{-10}$ M. In certain other embodiments, the protein binds with a $K_d$ of $1$-$5 \times 10^{-9}$ M.

As used herein, "homodivalent" refers to the presence of two identical peptides, such as $V_HH$ fragments.

As used herein, "heterodivalent" refers to the presence of two different peptides, such as $V_HH$ fragments.

According to an embodiment, the invention concerns the protein, wherein said protein is specific for 1, preferably 2, more preferred 3, preferably 4 pathogen surface components, such as virulence factors, and/or molecules secreted by a pathogen. The virulence factors may be from different or from the same group of virulence factors from an organism.

According to an embodiment, the invention concerns the protein, wherein said protein comprises peptides, such as single-domain antibodies which are specific for virulence factors, wherein said virulence factors form part of or constitutes target proteins, wherein said target proteins are from the same protein subfamily. A protein subfamily may be defined according to the Structural Classification of Proteins (SCOP) database classification system.

According to an embodiment, the invention concerns the protein, wherein at least one of said virulence factors is an adhesion factor.

As used herein, an "adhesion factor" refers to a type of virulence factor, which is a cell-surface component or appendages of a bacteria that facilitate adhesion or adherence to other cells or to surfaces.

According to an embodiment, the invention concerns the protein, wherein said first and second single domain antibody are specific for virulence factors from the same or two different microorganisms.

According to an embodiment, the invention concerns the protein, wherein said first single-domain antibody is specific for an adhesion factor of a microorganism and said second single-domain antibody is specific for one soluble virulence factor of a microorganism.

According to an embodiment, the invention concerns the protein, wherein said microorganism or microorganisms are selected among *Escherichia coli* bacteria, *Vibrio cholera*, and *Shigella* bacteria.

According to an embodiment, the invention concerns the protein, wherein said pathogen or pathogens are selected among F4₊ *Escherichia coli* bacteria and F18₊ *Escherichia coli* bacteria.

According to an embodiment, the invention concerns the protein, wherein said first pathogen is a F4⁺ *Escherichia coli* bacteria and said second pathogen is a F18⁺ *Escherichia coli* bacteria.

Enterotoxigenic *Escherichia coli* (ETEC), shigatoxigenic *Escherichia coli* (STEC) and verotoxigenic *Escherichia coli* (VTEC) have two crucial virulence factors; adherence factors, often fimbriae, and the production of one or multiple toxins that induce disease symptoms.

As used herein, "F4⁺ *Escherichia coli*" refers to enterotoxigenic *Escherichia coli* strains bearing F4 fimbriae (F4⁺ ETEC), where colonization is followed by secretion of one or more toxins, for example heat-labile toxin (LT).

As used herein, "F18⁺ *Escherichia coli*" refers to enterotoxigenic *Escherichia coli* strains bearing F18 fimbriae (F18⁺ ETEC), where colonization is followed by secretion of one or more toxins, as for example heat-labile toxin (LT) and/or heat-stable enterotoxins (ST). F18⁺ STEC strains produce the Shiga toxin Stx2e, and F18⁺ VTEC strains produce Shiga-like toxins.

According to an embodiment, the invention concerns the protein, wherein said first pathogen produces heat-labile toxin (LT toxin).

According to an embodiment, the invention concerns the protein, wherein said second pathogen produces a Shiga toxin, such as selected among stx2e and porcine and human variants of stx2e.

According to an embodiment, the invention concerns the protein, wherein said first and/or second pathogen are ETEC *Escherichia coli* bearing fimbriae types or a fimbrial adhesions such as, F5, F6, F41 or AIFA, human specific variants such as, colonization factor antigens (CFA) or coli surface antigen (CS), including but not restricted to CFAI, CFAII, CFAIII and CFAIV.

According to an embodiment, the invention concerns the protein, wherein said first and/or second pathogen produces a Shiga or Shiga-like toxin, such as Stx2e and human variants, including, but not restricted to, stx, stx1a, stx1c, stxd, stx2a, stx2b, stx2c, stx2d, stx2f, and stx2g.

According to an embodiment, the invention concerns the protein, wherein said virulence factors are selected among ETEC fimbrial adhesins, such as F4 and F18, a heat-labile enterotoxin (LT) and a Shiga or Shiga-like toxin, such as Stx2e and porcine and human variants thereof.

According to an embodiment, the invention concerns the protein, wherein said virulence factors are selected among the group consisting of F18⁺, F4⁺, Stx2e, LT and porcine and human variants of these.

In one embodiment of the present invention said first and/or said second peptide comprises an amino acid sequence having at least 90%, such as at least 95%, such as at least 98%, such as at least 99% sequence identity to the amino acid sequence of SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9 and/or SEQ ID NO:10.

The present invention also encompasses the use of peptides having a degree of sequence identity or sequence homology with amino acid sequence(s) defined herein or with a peptide having the specific properties defined herein. The present invention encompasses, in particular, peptides having a degree of sequence identity with SEQ ID NO:1-10, or homologues thereof. Here, the term "homologue" means an entity having sequence identity with the subject amino acid sequences.

In some embodiment of the present invention, said first and/or said second peptide essentially consisting of four "framework regions" which are referred to in the art and herein below as "framework region 1" or "FR1"; as "framework region 2" or "FR2"; as "framework region 3" or "FR3"; and as "framework region 4" or "FR4", respectively; which framework regions are interrupted by three "complementarity determining regions" or "CDRs", which are referred to in the art and herein below as "complementarity determining region" or "CDR1"; as "complementarity determining region 2" or "CDR2"; and as "complementarity determining region 3" or "CDR3", respectively. Thus, the general structure or sequence of said first and/or said second peptide can be indicated as follows: FR1-CDR1-FR2-CDR2-FR3-CDR3-FR4. It is said first and/or said second peptide that confer the first and/or second binding specificity of said first and/or said second peptide.

In one embodiment, said first and/or said second peptide comprise CDR1, CDR2 and/or CDR3 within the amino acid sequence of SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9 and/or SEQ ID NO:10.

In one embodiment, any sequence variance is outside the CDRs.

In one embodiment, the sequence variance is within the framework regions of said first and/or said second peptide.

In one embodiment, said first and/or second peptide comprises three complementarity determining regions CDR1, CDR2 and CDR3, wherein CDR1 has an amino acid sequence comprising an amino acid sequences of SEQ ID NO: 27, CDR2 has an amino acid sequence comprising an amino acid sequences of SEQ ID NO: 29 and CDR3 has an amino acid sequence comprising an amino acid sequences of SEQ ID NO: 31.

In one embodiment, said first and/or second peptide comprises three complementarity determining regions CDR1, CDR2 and CDR3, wherein CDR1 has an amino acid sequence comprising an amino acid sequences of SEQ ID NO: 28, CDR2 has an amino acid sequence comprising an amino acid sequences of SEQ ID NO: 30 and CDR3 has an amino acid sequence comprising an amino acid sequences of SEQ ID NO: 32.

In one embodiment, said protein comprises a first and a second peptide, wherein said first peptide comprises three complementarity determining regions CDR1, CDR2 and CDR3, wherein CDR1 has an amino acid sequence comprising an amino acid sequences of SEQ ID NO: 27, CDR2 has an amino acid sequence comprising an amino acid sequences of SEQ ID NO: 29 and CDR3 has an amino acid sequence comprising an amino acid sequences of SEQ ID NO: 31 and wherein said second peptide comprises three complementarity determining regions CDR1, CDR2 and CDR3, wherein CDR1 has an amino acid sequence comprising an amino acid sequences of SEQ ID NO: 28, CDR2 has an amino acid sequence comprising an amino acid sequences of SEQ ID NO: 30 and CDR3 has an amino acid sequence comprising an amino acid sequences of SEQ ID NO: 32. In one aspect, the homologous amino acid sequence should provide a peptide which retains the functional activity of peptides of SEQ ID NO: 1-10.

In one embodiment, said first and/or second peptide of SEQ ID NOs: 1-4 and SEQ ID NO: 10 binds to FaeG on F4$_+$ *Escherichia coli* bacteria In another embodiment, said first and/or second peptide of SEQ ID NO: 5 binds to the B subunit of Stx2e.

In another embodiment, said first and/or second peptide of SEQ ID NOs: 6-8 binds to FedF on F18$_+$ *Escherichia coli* bacteria In another embodiment, said first and/or second peptide of SEQ ID NO: 9 binds to the B subunit of LT.

In the present context, a homologous sequence is taken to include an amino acid sequence which may be at least 90%, at least 95%, at least 98% or at least 99%, identical to the subject sequence. Typically, the homologues will comprise the same active sites etc. as the subject amino acid sequence. Although homology can also be considered in terms of similarity (i.e. amino acid residues having similar chemical properties/functions), in the context of the present invention it is preferred to express homology in terms of sequence identity.

In one embodiment, the protein according to the invention comprises a first and a second peptide, wherein said first and said second peptides both comprise an amino acids sequence having at least 90%, such as at least 95%, such as at least 98%, such as at least 99% sequence identity to the amino acid sequence of SEQ ID NO:8.

In another embodiment, the protein according to the invention comprises a first and a second peptide, wherein said first and said second peptides both comprise an amino acids sequence having at least 90%, such as at least 95%, such as at least 98%, such as at least 99% sequence identity to the amino acid sequence of SEQ ID NO:10.

In another embodiment, the protein according to the invention comprises a first and a second peptide, wherein said first and said second peptides both comprise an amino acids sequence having at least 90%, such as at least 95%, such as at least 98%, such as at least 99% sequence identity to the amino acid sequence of SEQ ID NO:5.

In another embodiment, the protein according to the invention comprises a first and a second peptide, wherein said first and said second peptides both comprise an amino acids sequence having at least 90%, such as at least 95%, such as at least 98%, such as at least 99% sequence identity to the amino acid sequence of SEQ ID NO:9.

In another embodiment, the protein according to the invention comprises a first and a second peptide, wherein said first peptide comprises an amino acids sequence having at least 90%, such as at least 95%, such as at least 98%, such as at least 99% sequence identity to the amino acid sequence of SEQ ID NO:10 and wherein said second peptide comprises an amino acids sequence having at least 90%, such as at least 95%, such as at least 98%, such as at least 99% sequence identity to the amino acid sequence of SEQ ID NO:9.

In another embodiment, the protein according to the invention comprises a first and a second peptide, wherein said first peptide comprises an amino acids sequence having at least 90%, such as at least 95%, such as at least 98%, such as at least 99% sequence identity to the amino acid sequence of SEQ ID NO:9 and wherein said second peptide comprises an amino acids sequence having at least 90%, such as at least 95%, such as at least 98%, such as at least 99% sequence identity to the amino acid sequence of SEQ ID NO:10.

Nucleic Acid

In one aspect, the present invention provides an isolated nucleic acid molecule encoding a protein as described herein.

By "nucleic acid molecule" we include DNA (e.g. genomic DNA or complementary DNA) and mRNA molecules, which may be single- or double-stranded. By "isolated" we mean that the nucleic acid molecule is not located or otherwise provided within a cell.

Vector

In one aspect, the present invention provides a vector comprising a nucleic acid molecule as described herein. In one embodiment, the vector is an expression vector.

Host Cell

In one aspect, the present invention provides a recombinant host cell comprising a nucleic acid molecule or a vector as described herein. In one embodiment, the host cell is a bacterium, a fungus, such as a yeast and/or a mammalian cell.

In one embodiment, the bacterium according to the present invention may be a *bacillus*, such as a *Bacillus licheniformis, Bacillus subtilis* and/or *Bacillus lactobacillus*.

In another embodiment, the yeast according to the present invention may be any species selected from the genus of *pichia, hansenula* and/or *saccharomyces*.

In yet another embodiment, the fungus according to the present invention may be an *Aspergillus oryzae* and/or *Aspergillus niger*.

Composition

Dietary Composition

The dietary composition according to the present invention may comprise a protein as described herein above. The dietary composition may furthermore comprise one or more of prebiotics, probiotics, synbiotics, proteins, lipids, carbohydrates, vitamins, fibers, and/or nutrients, such as dietary minerals for a living subject In one aspect, the dietary composition is a food additive.

In another aspect, the invention concerns the use of a dietary composition for promoting growth of a subject.

In another aspect, the invention concerns the use of a dietary composition as an addition to infant formula product.

In another aspect, the invention concerns the use of a dietary composition as a protective aid against pathogen infections in a subject during traveling.

In another aspect, the invention concerns the use a dietary composition as a protective aid against pathogen infections in subjects with impaired immune efficiency, such as elderly people.

In aspects of the inventions, the use of the dietary composition is non-therapeutic.

Pharmaceutical Composition

The present invention also provides a pharmaceutical composition comprising a protein, a nucleic acid, a vector and/or a recombinant host cell as described herein and further comprising one or more compounds. Said compound can be an active compound and/or an excipient.

In one embodiment, the active compounds and/or excipient is one or more of complex carbohydrates such as cellulose and/or alginate, enzymes, activated charcoal, surfactants, antibiotics, antiadherents, binders, coating agents, disintegrants, fillers, solvents/co-solvents, flavours, colours, lubricants, glidants, preservatives, sorbents, sweeteners, carriers, polymers, buffering agents, antioxidants, wetting agents, antifoaming agents, thickening agents, humectants and mixtures thereof.

According to an embodiment, the invention concerns a composition comprising a protein, and optionally one or more excipients, diluents, proteins, and/or binders. According to an embodiment, a composition according to the invention may further or alternatively comprise one or more adhirons, adnectins, affibodies, affitins, anticalins, armadillo repeat proteins, avimers, beta-hairpin mimetics, bicyclic peptides, DARPins and/or fynomers.

The invention furthermore provides a protein described herein above, as well as dietary compositions comprising one or more of said proteins, and/or pharmaceutical compositions comprising one or more of said proteins.

According to an embodiment, the invention concerns the composition, comprising a first single-domain antibody, which is specific for a first virulence factor, and a second single-domain antibody, which is specific for a second virulence factor.

According to an embodiment, the invention concerns the composition, wherein said second single-domain antibody is identical to or different from said first single-domain antibody.

According to an embodiment, the invention concerns the composition, wherein said second virulence factor is identical to or different from said first virulence factor.

According to an embodiment, the invention concerns the composition, comprising single-domain antibodies specific for 2, preferably 3, more preferred 4, preferably 5, more preferred 6, preferably 7, more preferred 8, preferably 9, more preferred 10, preferably 11, more preferred 12 different virulence factors. According to an embodiment, said single domain antibodies may form part of one or more, such as 1, 2, 3, 4, 5, 6, 7, 8, 9, 10, 11 or 12 proteins.

According to an embodiment, the invention concerns the composition, comprising a protein of the invention, and in addition one or more single-domain antibodies, preferably 1-5, more preferred 2-3, different single-domain antibodies, wherein said different single-domain antibodies each are specific for at least one virulence factor.

According to an embodiment, the invention concerns the protein or composition, wherein said protein or composition comprises a first single-domain antibody, which is specific for said first virulence factor, and a second single-domain antibody, which is specific for said second virulence factor.

According to an embodiment, the invention concerns the composition, wherein at least one of said virulence factors is an adhesion factor.

As used herein, an "adhesion factor" refers to a type of virulence factor, which is a cell-surface component or appendages of a bacterium that facilitate adhesion or adherence to other cells or to surfaces.

According to an embodiment, the invention concerns the composition, wherein said first and second single domain antibody are specific for virulence factors from the same or two different microorganisms.

According to an embodiment, the invention concerns the composition, wherein said first single-domain antibody is specific for an adhesion factor of a microorganism and said second single-domain antibody is specific for one soluble virulence factor of a microorganism.

According to an embodiment, the invention concerns the composition, wherein said microorganism or microorganisms are selected among *Escherichia coli* bacteria, *Vibrio cholera*, and *Shigella* bacteria.

According to an embodiment, the invention concerns the composition, wherein said virulence factors are selected among ETEC fimbrial adhesins, such as F4 and F18, a heat-labile enterotoxin (LT) and a Shiga or Shiga-like toxin, such as Stx2e and porcine and human variants thereof.

According to an embodiment, the invention concerns the composition, wherein said virulence factors are selected among the group consisting of $F18^+$, $F4^+$, Stx2e, LT and porcine and human variants of these.

Diseases

In one aspect, the present invention provides a protein, a nucleic acid, a vector, a recombinant host cell or a pharmaceutical composition as described herein for use as a medicament.

In another aspect, the present invention provides a protein, a nucleic acid, a vector, a recombinant host cell or a pharmaceutical composition as described herein for use in the prevention or treatment of a pathogen induced infection associated with an internal and/or external surface of a subject. In one embodiment, the infection is a gastrointestinal infection. In another embodiment, wherein the infection is a pulmonary infection.

In one aspect, the administration route of the protein, the nucleic acid, the vector, the host cell or the pharmaceutical composition is oral, pulmonary, and/or topical. In one embodiment administration is by a nebulizer.

In one embodiment, the protein, the nucleic acid, the vector, the host cell or the pharmaceutical composition is administered one or more times to the subject.

In one aspect, the present invention provides a protein, a nucleic acid, a vector, a recombinant host cell or a pharmaceutical composition as described herein for use in reducing the active infection time span in a subject. In one embodiment, the active infection time span is reduced with at least 20%, such as at least 30%, such as at least 40%, such as at least 50%.

In one embodiment, the protein is capable of reducing the active infection time span for an F4 ETEC infection in a subject, such as piglets.

In another aspect, the present invention provides a protein, a nucleic acid, a vector, a recombinant host cell or a pharmaceutical composition as described herein for use in reducing virulence in a subject.

In one embodiment, the subject is a human. In another embodiment, the subject is a livestock animal, such as an animal selected from the group of pigs, cattle, sheep, goats, horses, chickens, donkeys, mules, ducks, geese and turkeys. It is preferred that the subject is a pig.

In another aspect, the present invention provides a protein, a nucleic acid, a vector, a recombinant host cell or a pharmaceutical composition as described herein for use in the prevention or treatment of post-weaning diarrhea (PWD).

In another aspect, the present invention provides a protein, a nucleic acid, a vector, a recombinant host cell or a pharmaceutical composition as described herein for use in the prevention or treatment of Edema disease.

According to an embodiment, the invention concerns the protein or composition for use as a medicament.

According to an embodiment, the invention concerns the protein or composition for use in the treatment of animals or humans.

According to an embodiment, the invention concerns the protein or composition for prophylactic use in animals or humans.

According to an embodiment, the invention concerns the protein or composition for non-systemic use and/or wherein said protein does not interact with the stomach lining, and which preferably does not interact with epithelial cells.

According to an embodiment, the invention concerns the protein or composition, wherein said protein is stable in the gastrointestinal tract.

By "stable in the gastrointestinal tract", it is meant that a product containing a single-domain antibody retains 10% or more, 20% or more, 30% or more, 40% or more, 50% or more, 60% or more, 70% or more, 80% or more, 90% or more of its binding activity after passing through the gastrointestinal tract.

According to an embodiment, the invention concerns the protein or composition, wherein said protein or composition is used as an addition to infant formula products, is to be used in combination with infant formula products, or is formulated as part of infant formula for animals or humans.

According to an embodiment, the invention concerns the protein or composition, wherein said protein or composition is used as a component of artificial colostrum.

According to an embodiment, the invention concerns the protein or composition for oral or pulmonal administration.

According to an embodiment, the invention concerns a method of treating or preventing a medical condition in animals or humans, comprising administration of the protein or composition.

According to an embodiment, the invention concerns a use of the protein or composition for the treatment or prevention of post-weaning diarrhoea (PWD).

In the farming industry, enterotoxigenic *Escherichia coli* (ETEC) and Shiga toxin producing *E. coli* (STEC) are important pathogens, causing high mortality and severe production losses. In piglets ETEC, VTEC, and STEC strains expressing F18$^+$ fimbriae are associated with post-weaning diarrhoea. After the initial adherence step facilitated by F4 or F18 fimbriae, ETEC strains produce and secrete the LT and/or Stx2e, thereby stimulating the secretion of electrolytes and water. This causes dehydration of the enterocytes and watery diarrhoea. F18$^+$ STEC strains produce the shiga toxin Stx2e and F18$^+$ VTEC strains produce shiga-like toxins. Damage to the vascular endothelium eventually results in edema, hemorrhage, and microthrombosis, and will be fatal in 90% of all VTEC affected animals.

A use of the protein or composition according to any of the preceding claims for the treatment or prevention of Edema disease. Edema disease is a severe disease characterized by neurological disorders, hemorrhagic lesions, and frequent fatal outcome. Swine edema disease is caused by enterotoxigenic and verotoxigenic Stx2e-producing *Escherichia coli*.

According to an embodiment, the invention concerns a non-therapeutic use of a protein or composition.

According to an embodiment, the invention concerns a non-therapeutic use of a protein or composition to promote growth in livestock.

According to an embodiment, the invention concerns a use of the protein or composition as fodder or fodder additive for mammals.

According to an embodiment, the invention concerns a use of the protein or composition, wherein said protein or composition is dissolved or dispersed in water for mammals, such as drinking water or water administered in combination with fodder.

According to an embodiment, the invention concerns a use of the protein or composition in combination with at least one antimicrobial agent.

According to an embodiment, the invention concerns a use, wherein the antimicrobial agent is Zinc oxide.

According to an embodiment, the invention concerns a use of the protein or composition for stabilizing the microbiome of humans or animals, preferably used for the manufacture of an agent for stabilizing the microbiome of humans or animals.

According to an embodiment, the invention concerns a use of the protein or composition for use as a non-therapeutic supplement for humans or animals.

According to an embodiment, the invention concerns a use of the protein or composition, for use as a protective aid against bacterial intestinal infections during traveling.

According to an embodiment, the invention concerns a use of the protein or composition, for use as a protective aid against bacterial intestinal infections in humans with impaired immune efficiency, such as elderly people, people with downregulated immune efficiency including HIV patients, organ recipients, patients in rheumatic treatment, patients in cancer treatment, and/or patients undergoing medical treatment for bacterial infections, such as pneumonia and sepsis.

According to an embodiment, the invention concerns a use of the protein or composition for prevention or treatment of infection caused by *Vibrio cholera*.

According to an embodiment, the invention concerns a medical use of the protein or composition.

According to an embodiment, the invention concerns a method of manufacturing a protein or composition, wherein at least one of the single-domain antibodies is expressed by a fungal host.

According to an embodiment, the invention concerns a method of manufacturing a protein or composition, wherein said fungal host is a yeast strain.

According to an embodiment, the invention concerns a method of manufacturing a protein or composition, wherein said fungal host is selected among the group consisting of *Aspergillus, Pichia, Hansenula*, and *Saccharomyces*.

According to an embodiment, the invention concerns a use of the protein or composition for the manufacture of a food ingredient for animal or human food.

Use of the Protein, Dietary Composition and/or Pharmaceutical Composition

In one embodiment, the invention concerns a method of crosslinking pathogens, the method comprising administering an effective amount of a protein, a dietary composition and/or a pharmaceutical composition according to any one of the preceding claims to a subject. The protein, dietary composition and pharmaceutical composition are as described herein.

In another embodiment, the invention concerns a method of preventing biofilm formation, the method comprising administering an effective amount of a protein, a dietary composition and/or a pharmaceutical composition according to any one of the preceding claims to a subject. The protein, dietary composition and pharmaceutical composition are as described herein.

In another embodiment, the invention concerns a method of neutralizing a pathogen and/or a molecule secreted by a pathogen, the method comprising administering an effective amount of a protein, a dietary composition and/or a pharmaceutical composition according to any one of the preceding claims to a subject. The protein, dietary composition and pharmaceutical composition are as described herein.

The invention also concerns the use of the protein, nucleic acid, vector or host cell as defined in any one of the preceding claims for the manufacture of a medicament for the prevention or treatment of a pathogen induced infection associated with an internal and/or external surface of a subject.

Method of Treatment

In one aspect, the present invention provides a method of treating or preventing a pathogen induced infection, such as a gastrointestinal infection and/or a pulmonary infection, the method comprising administering a therapeutically effective amount of a protein, a nucleic acid, a vector, a recombinant host cell or a pharmaceutical composition as described herein to the subject.

An "effective amount" or "therapeutically effective amount" of a compound is that amount of compound which is sufficient to provide a beneficial effect to the subject to which the compound is administered. The phrase "therapeutically effective amount," as used herein, may refer to an amount of a protein that is sufficient or effective to treat (delay or prevent the onset of, prevent the progression of, inhibit, decrease or reverse) an infection.

Pathogen

The pathogen may be any pathogen, such as a bacterium, a virus, a fungus, a protozoa and/or a worm.

In one embodiment, the pathogen is an *Escherichia coli* bacteria, a *Vibrio cholera* bacteria, a *Salmonella*, a *Campylobacter* bacteria, a *Staphylococcus* bacteria, a *Listeria* bacteria, a *Shigella* bacteria, *Mycoplasma* and/or *Clostridium difficile*.

In another embodiment, the pathogen is a F4$^+$ *Escherichia coli* bacteria and/or a F18$^+$ *Escherichia coli* bacteria.

In another embodiment, one of said first or said second peptide binds to F4$^+$ *Escherichia coli* bacteria and wherein the other peptide binds F18$^+$ *Escherichia coli* bacteria.

In another embodiment, said pathogen produces heat-labile toxin (LT toxin).

In another embodiment, said pathogen produces a Shiga toxin, such as selected among stx2e and porcine and human variants of stx2e, or a Shiga-like toxin.

In one embodiment, said pathogen is ETEC *Escherichia coli* bearing fimbriae types or fimbrial adhesions such as, F5, F6, F41 or AIFA, human specific variants such as, colonization factor antigens (CFA) or coli surface antigen (CS), including but not restricted to CFAI, CFAII, CFAIII and CFAIV.

In one embodiment, said pathogen produces a Shiga or Shiga-like toxin, such as Stx2e and human variants, including, but not restricted to, stx, stx1a, stx1c, stxd, stx2a, stx2b, stx2c, stx2d, stx2f and stx2g.

Method for Producing

The present invention provides a method for producing a protein according to any one of the above aspects, the method comprising culturing a host cell as defined herein under conditions which permit expression of the encoded protein.

Thus, the present invention relates to a method of producing a protein as described herein, the method comprises:
 a) transfecting the nucleic acid molecule as described herein above and/or the vector as described herein above into a host cell to obtain the recombinant host cell as described herein above;
 b) culturing the recombinant host cell under suitable conditions;
 c) collecting and purifying the protein expressed from said recombinant host cell.

Thus, the recombinant host cell may be cultured under conditions which permit expression of the encoded protein.

Items

1. A protein comprising at least two single-domain antibodies, wherein said protein is specific for at least a first virulence factor and a second virulence factor.
2. The protein according to item 1, wherein said second virulence factor is identical to or different from said first virulence factor.
3. The protein according to any of the preceding items, wherein said at least two single-domain antibodies are linked together through a linker.
4. The protein according to any of the preceding items, wherein said at least two single-domain antibodies are linked together through a GS linker.
5. The protein according to item 4, wherein said GS linker is of the structure $(G_xS)_n$, where x may be a number between 1 to 10, preferably 2 to 5, and n refers to a number of repeats of the $G_xS$ sequence, where n may be between 1 to 10, preferably 2 to 5.
6. The protein according to item 4 or 5, wherein said GS linker is a GGGGSGGGGSGGGGS linker (SEQ ID NO: 22).
7. The protein according to any of the preceding items, wherein said protein comprises a first single-domain antibody, which is specific for said first virulence factor, and a second single-domain antibody, which is specific for said second virulence factor.
8. The protein according to any of the preceding items, wherein said protein is homodivalent or heterodivalent.
9. The protein according to any of the preceding items, wherein said protein is specific for 1, preferably 2, more preferred 3, preferably 4 virulence factors.
10. The protein according to any of the preceding items, wherein said protein comprises single-domain antibodies which are specific for virulence factors, wherein said virulence factors form part of or constitutes target proteins, wherein said target proteins are from the same protein subfamily.
11. The protein according to item 10, wherein said protein subfamily is defined according to the SCOP system.
12. A composition comprising a protein according to any of the preceding items, and optionally one or more excipients, diluents, proteins, and/or binders.
13. A composition according to item 12, said composition comprising a number of different proteins, each of said proteins being according to any of the preceding items, wherein said number is selected among the group consisting of 2, 3, 4, 5, 6, 7, 8, 9, 10, 11, and 12.
14. The composition according to item 13, wherein each of said proteins is specific for one or two virulence factors.
15. A composition comprising a first single-domain antibody, which is specific for a first virulence factor, and a second single-domain antibody, which is specific for a second virulence factor.
16. The composition according to item 15, wherein said second single-domain antibody is identical to or different from said first single-domain antibody.
17. The composition according to item 15 or 16, wherein said second virulence factor is identical to or different from said first virulence factor.
18. The composition according to any of the items 12-17, comprising single-domain antibodies specific for 2, preferably 3, more preferred 4, preferably 5 different virulence factors.
19. The composition according to any of the items 12-18, comprising a protein according to any of the items 1-11, and in addition one or more single-domain antibodies, preferably 1-5, more preferred 2-3, different single-domain antibodies, wherein said different single-domain antibodies each are specific for at least one virulence factor.
20. The protein or composition according to any of the preceding items, wherein said protein or composition comprises a first single-domain antibody, which is specific for said first virulence factor, and a second single-domain antibody, which is specific for said second virulence factor.

21. The protein or composition according to any of the preceding items, comprising at least one single-domain antibody which is toxin-neutralizing.
22. The protein or composition according to any of the preceding items, wherein at least one of said virulence factors is an adhesion factor.
23. The protein or composition according to any of the preceding items, wherein said first and second single domain antibody are specific for virulence factors from the same or two different microorganisms.
24. The protein or composition according to any of the preceding items, wherein said first single-domain antibody is specific for an adhesion factor of a microorganism and said second single-domain antibody is specific for one soluble virulence factor of the same or a different microorganism.
25. The protein or composition according to any of the items 23-24, wherein said microorganism or microorganisms are selected among *Escherichia coli* bacteria, *Vibrio cholera* bacteria, and *Shigella* bacteria.
26. The protein according to any of the items 23-25, wherein said microorganism or microorganisms are selected among F4$^+$ *Escherichia coli* bacteria and F18$^+$ *Escherichia coli* bacteria.
27. The protein according to any of the items 23-26, wherein said first microorganism is a F4$^+$ *Escherichia coli* bacteria and said second microorganism is a F18$^+$ *Escherichia coli* bacteria.
28. The protein according to any of the items 23-27, wherein said first microorganism produces heat-labile toxin (LT toxin).
29. The protein according to any of the items 23-28, wherein said second microorganism produces a Shiga toxin, such as selected among stx2e and porcine and human variants of stx2e, or a Shiga-like toxin.
30. The protein according to any of the items 23-29, wherein said first and/or second microorganism are ETEC *Escherichia coli* bearing fimbriae types or a fimbrial adhesions such as, F5, F6, F41 or AlFA, human specific variants such as, colonization factor antigens (CFA) or coli surface antigen (CS), including but not restricted to CFAI, CFAII, CFAIII and CFAIV.
31. The protein according to any of the items 23-30, wherein said first and/or second microorganism produces a Shiga or Shiga-like toxin, such as Stx2e and human variants, including, but not restricted to, stx, stx1a, stx1c, stxd, stx2a, stx2b, stx2c, stx2d, stx2f and stx2g.
32. The protein or composition according to any of the preceding items, wherein said virulence factors are selected among ETEC fimbrial adhesins, such as F4 and F18, a heat-labile enterotoxin (LT) and a Shiga or Shiga-like toxin, such as Stx2e and porcine and human variants thereof.
33. The protein or composition according to any of the preceding items, wherein said virulence factors are selected among the group consisting of F18$^+$, F4$^+$, Stx2e, LT and porcine and human variants of these.
34. The protein or composition according to any of the preceding items, for use as a medicament.
35. The protein or composition of item 34, for use in the treatment of animals or humans.
36. The protein or composition according to any of the preceding items, for prophylactic use in animals or humans.
37. The protein or composition according to any of the preceding items, for non-systemic use and/or wherein said protein does not interact with the stomach lining, and which preferably does not interact with epithelial cells.
38. The protein or composition according to any of the preceding items, wherein said protein or composition is stable in the gastrointestinal tract.
39. The protein or composition according to any of the preceding items, wherein said protein or composition is used as an addition to infant formula products, is to be used in combination with infant formula products, or is formulated as part of infant formula for animals or humans.
40. The protein or composition according to any of the preceding items, wherein said protein or composition is used as a component of or in addition to artificial colostrum and/or natural colostrum.
41. The protein or composition according to any of the preceding items for oral or pulmonal administration.
42. A method of treating or preventing a medical condition in animals or humans, comprising administration of the protein or composition according to any of the preceding items.
43. A use of the protein or composition according to any of the preceding items for the treatment or prevention of post-weaning diarrhoea (PWD).
44. A use of the protein or composition according to any of the preceding items for the treatment or prevention of Edema disease.
45. A non-therapeutic use of a protein or composition according to any of the items 1-33, 36-41.
46. A therapeutic or non-therapeutic use of a protein or composition according to any of the preceding items to promote growth in livestock.
47. The use of the protein or composition according to any of the preceding items as fodder or fodder additive for mammals.
48. The use of the protein or composition according any of the preceding items, wherein said protein or composition is dissolved or dispersed in water for mammals, such as drinking water or water administered in combination with fodder.
49. A use of the protein or composition according to any of the preceding items, in combination with at least one antimicrobial agent.
50. The use according to item 49, wherein the antimicrobial agent is Zinc oxide.
51. A use of the protein or composition according to any of the preceding items, for stabilizing the microbiome of humans or animals, preferably as used for the manufacture of an agent for stabilizing the microbiome of humans or animals.
52. A use of the protein or composition according to any of the preceding items, for use as a therapeutic or non-therapeutic supplement, for humans or animals.
53. A use of the protein or composition according to any of the preceding items, for use as a protective aid against bacterial intestinal infections during traveling.
54. A use of the protein or composition according to any of the preceding items for use as a protective aid against bacterial intestinal infections in humans with impaired immune efficiency, such as elderly people, people with downregulated immune efficiency including HIV patients, organ recipients, patients in rheumatic treatment, patients in cancer treatment, and/or patients undergoing medical treatment for bacterial infections, such as pneumonia and sepsis.

55. A use of the protein or composition according to any of the preceding items for prevention or treatment of infection caused by *Vibrio cholera*.

56. A medical use of the protein or composition according to any of the preceding items.

57. A method of manufacturing a protein or composition according to any of the preceding items, wherein at least one protein comprising a single-domain antibody is expressed by a fungal host.

58. The method of manufacturing a protein or composition according to item 57, wherein said fungal host is a yeast strain.

59. A method of manufacturing a protein or composition according to item 57-58, wherein said fungal host is selected among the group consisting of *Aspergillus, Pichia, Hansenula* and *Saccharomyces*.

60. A use of the protein or composition according to any of the preceding items for the manufacture of a food ingredient for animal or human food, preferably wherein said protein or composition is used together with probiotics, prebiotics, and/or synbiotics.

EXAMPLES

The following examples are intended to illustrate the present invention and are in no way to be understood as limiting.

Example 1: Construction of Single-Domain Antibody Constructs for Expression in *Aspergillus oryzae*

All single-domain antibodies used in this study are generated and subsequently selected and optimized in already published studies; Lo et al. 2014 (The molecular Mechanism of Shiga Toxin stx2e Neutralization by Single-domain Antibody Targeting the Cell Receptor-binding Domain); Moonens et al. 2014 (Nanobody Mediated Inhibition of Attachment of F18 Fimbriae Expressing *Escherichia coli*); Virdi et al. 2013 (Orally fed seeds producing designer IgAs protect weaned piglets against enterotoxigenic *Escherichia coli* infection) and Harmsen et al. 2006 (Selection and optimization of proteolytically stable llama single-domain antibody fragments for oral immunotherapy). Nevertheless, common to all single-domain antibodies is that they were obtained by immunization of a healthy llama with F4, F18, stx4e, or LT antigens, and at a specific time point after immunization, a blood-sample was collected from the animal. Blood lymphocytes, as the genetic source of the single-domain antibodies, were isolated from the blood samples and total RNA extracted. Following standard methods of PCR, cloning, and ligation of nucleotides, the nanobody gene sequences were cloned into an appropriate vector and transformed into *E. coli* to generate a clone library. For expression of the single-domain antibodies in *Aspergillus oryzae*, synthetic genes with the different single-domain antibodies were constructed as described by Christensen et al. 1988 (High Level Expression of Recombinant Genes in *Aspergillus oryzae*). For bivalent single-domain antibody constructs, a linker region was introduced, either for the linkers (GGGGS)$_3$ or a porcine IgG3 hinge region. In table 1, the single-domain antibody constructs and specific target are depicted.

TABLE 1

Single-domain antibody constructs:

| Nanobody type | Name | Target | SEQ ID NO: |
|---|---|---|---|
| Single | F41 | F4 (FaeG) | 1 |
| Single | F42 | F4 (FaeG) | 2 |
| Single | F43 | F4 (FaeG) | 3 |
| Single | F44 | F4 (FaeG) | 4 |
| Single | Stx2e1 | Stx2e (B subunit) | 5 |
| Single | F181 | F18 (FedF) | 6 |
| Single | F182 | F18 (FedF) | 7 |
| Single | F183 | F18 (FedF) | 8 |
| Single | LT1 | LT (B subunit) | 9 |
| Single | F45 | F4 (FaeG) | 10 |
| Bivalent | F183:(GGGGS)$_3$::F183 | F18 (FedF) | 11 |
| Bivalent | F183::IgG3::F183 | F18 (FedF) | 12 |
| Bivalent | F45::(GGGGS)$_3$::F45 | F4 (FaeG) | 13 |
| Bivalent | Stx2e1::(GGGGS)$_3$::Stx2e1 | Stx2e (B subunit) | 14 |
| Bivalent | LT1::(GGGGS)$_3$::LT1 | LT (B subunit) | 15 |
| Heterovalent | F45::(GGGGS)$_3$::LT1 | F4 (FaeG) and LT (B subunit) | 16 |
| Heterovalent | LT1::(GGGGS)$_3$::F45 | F4 (FaeG) and LT (B subunit) | 17 |
| Heterovalent | F183::(GGGGS)$_3$::Stx2e1 | F18 (FedF) and Stx2e (B subunit) | 18 |
| Heterovalent | Stx2e1::(GGGGS)$_3$::F183 | F18 (FedF) and Stx2e (B subunit) | 19 |

Example 2: Selection and Production of Single-Domain Antibody Construct-Expressing *Aspergillus oryzae*

The plasmids were transformed into *Aspergillus oryzae*, a filamentous fungus with the ability to produce and secrete proteins in a fermentation process. Transformation was done as described by Christensen et al. 1988 (High Level Expression of Recombinant Genes in *Aspergillus oryzae*). Transformants, which produced the single-domain antibody construct, were identified by the appearance of an extra band at approximately 15 kD on an SDS-gel, compared to supernatant from the untransformed parental strain. The culture was filtrated and the resulting supernatant containing the single-domain antibody construct was used for further analysis.

Example 3: In Vitro Test of Binding Capacity of Homo- and Heterodivalent Protein Constructs Method and Material To detect protein binding to bacteria an ELISA assays were designed. In short; Nunc MaxiSorp™ Plate F96 were coated with approximately 5-25 ng/mL untagged F45::(GGGGS)$_3$::F45 homodivalent protein construct (SEQ ID NO:13) in phosphate buffered saline (PBS) pH 7.4 overnight (O/N) at 4° C. After blocking with either milk or bovine serum albumin (3%), heat killed F4$_+$ *E. coli* (0149:F4) at OD600=0.2 were added in milk or BSA and incubated on the plates at room temperature. Heat killing of the bacteria was done after washing in PBS and in a 56° C. water bath for 1 hour. To detect *E. coli*, FLAG-tagged protein constructs encoding F45::(GGGGS)$_3$::F45 (SEQ ID NO:13) or F45::(GGGGS)$_3$::LT1 (SEQ ID NO:16), were added after washing. Anti-FLAG-HRP from SIGMA (A8592) was used to detect the homodivalent-FLAG or the heterodivalent-FLAG protein constructs. To develop, substrate solution (1:1 Mixture of $H_2O_2$ and Tetramethylbenzidine) was used and to stop the reaction an equal amount of 2M $H_3PO_4$ was added. Optical density was determined using a microplate reader measuring at 450 nm.

Results

Figure 4:
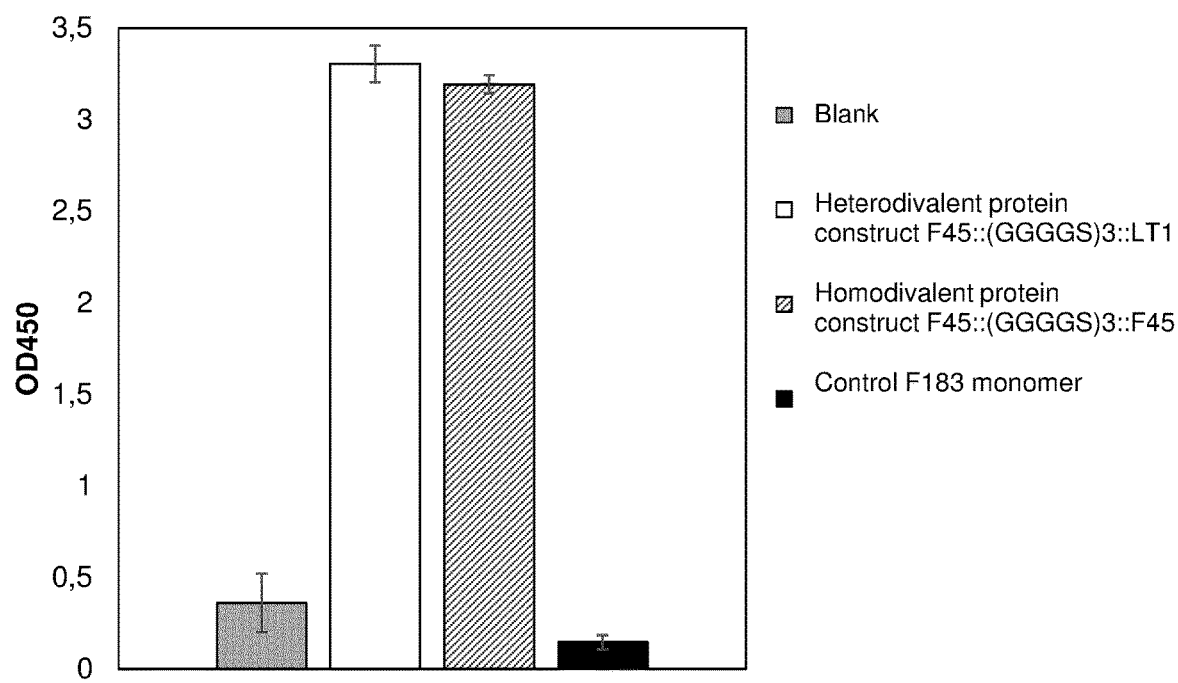
FIG. 4: Results from biding capacity tests of homo- and heterodivalente protein constructs. The measured OD450 shows a signal when the product binds in the ELISA assay, higher signal means more product bound.

The measured OD450 shows a signal when the product binds in the ELISA assay, higher signal means more product bound. Thus, binding of F45::(GGGGS)$_3$::F45 homodivalent protein construct and F45::(GGGGS)$_3$::LT1 heterodivalent protein construct were confirmed in an ELISA setup for binding to F4 ETEC bacteria (see FIG. 4). The included negative control F183 (SEQ ID NO: 8) is specific for FedF rather than FaeG.

Conclusion

The homo- and heterodivalent protein constructs are active and bind to F4 ETEC bacteria.

Example 4: In Vitro Test of Citric Acid Stability of Single-Domain Antibody and Homodivalent Protein Construct Method and Material Citric acid stability was compared between monomer single-domain antibody and homodivalent protein constructs. First untagged F45::(GGGGS)$_3$::F45 homodivalent protein construct was used to coat plate wells, then bacteria were added to bind, excess bacteria was washed off and then either F45 single-domain antibodies (SEQ ID NO:10) or F45::(GGGGS)$_3$::F45 homodivalent protein construct (SEQ ID NO:13) attached to a FLAG tag were added. After wash, 0.2 M citric acid was added to the wells. The citric acid eluate was transferred to another ELISA plate, that had also been coated with untagged F45::(GGGGS)$_3$::F45 homodivalent protein construct, and bound by bacteria, the citric acid was then neutralized with NaOH and single-domain antibody-FLAG was allowed to re-bind to bacteria. Both plates were then incubated with anti FLAG and developed as described in Example 3 (ELISA). The OD450 signal shows the amount of product bound.

A standard curve was added to each plate to ensure that the values from the product were within the linear range of the ELISA assay.

Figure 5:
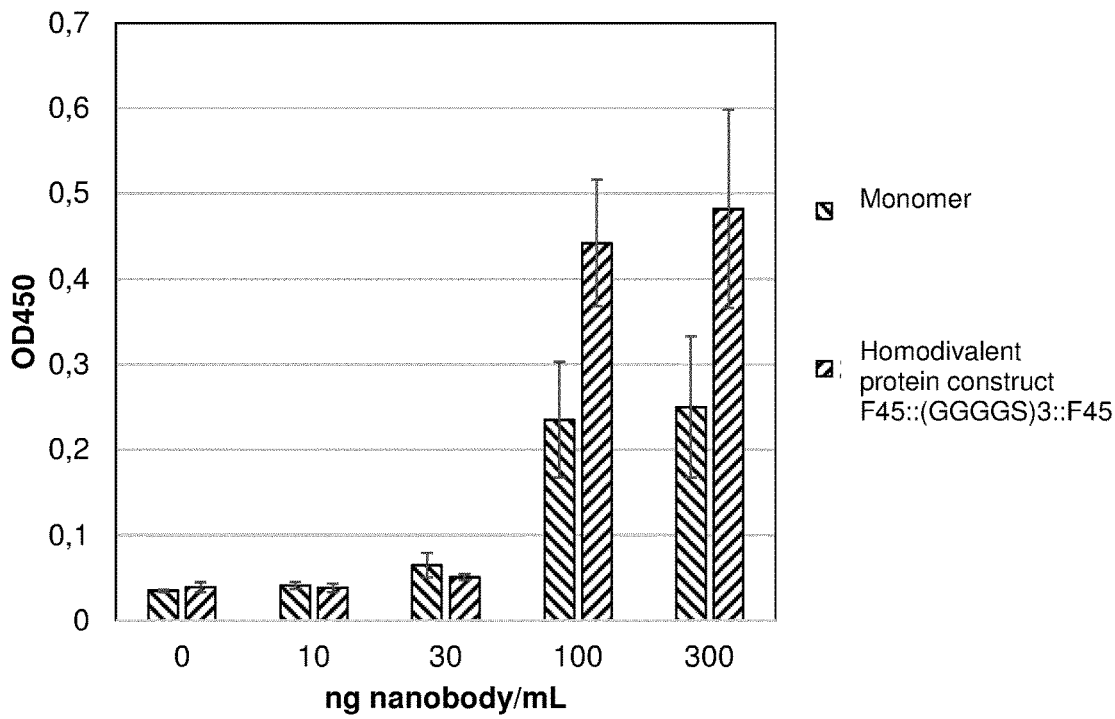
FIG. 5: Results from stability test of monomers and homodivalente protein constructs with and without citric acid exposure. Panel A) shows the amount of monomers and homodivalente protein constructs which were not detached upon citric acid chock i.e. the amount of product, which remained in the well. Panel B) shows the amount of monomers and homodivalente protein constructs which were eluted off after citric acid chock.
Figure 5:
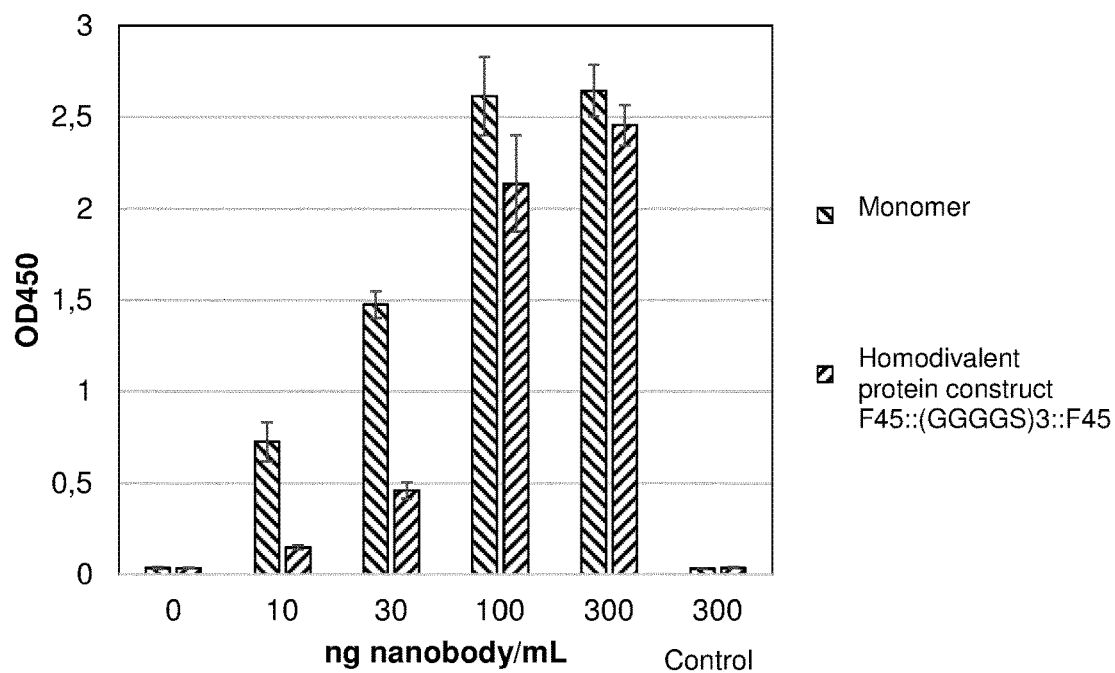

Results:

In FIG. 5A, a high signal corresponds to a higher binding affinity as the product could not be detached with the citric acid. A higher amount of F45::(GGGGS)$_3$::F45 homodivalent protein construct remained in the well compared to F45 single-domain antibodies after citric acid chock. Hereby, demonstrating that homodivalente protein constructs adhere better after citric acid chock to bacteria, than single-domain antibodies (FIG. 5A).

FIG. 5B shows the quantification of F45 single-domain antibodies and F45::(GGGGS)$_3$::F45 homodivalent protein construct eluted off after citric acid chock, thus it is a measure of how easily the product is washed off from ETEC bacteria. A lower amount of homodivalent protein constructs were detected in the ELISA assay compared to single-domain antibodies, documenting that less homodivalent protein constructs were eluted of compared to single-domain antibodies.

Conclusion

We can conclude that the homodivalent protein construct binds with higher affinity than the single-domain antibody, i.e. the monomer as more product remains after acid chock, as well as less homodivalent protein construct is eluted of.

Thus, the binding affinity of the homodivalent protein construct is at least 1.5 times higher compared to the monomer upon citric acid exposure.

Example 5: In Vitro Test of Thermostability, pH Stability, Bile Salt Stability, Stability in Pig Gastric Juice Over Time, Stability in Pig Gall Over Time, of Homodivalent Protein Constructs Material and Method:

The ELISA was performed as described in Example 3.

A standard curve was added to each plate to ensure that the values from the product were within the linear range of the ELISA assay.

The relative values show how much signal is detected, and hence product is bound, after incubation, meaning a high signal indicates high retention of signal and high stability.

Thermostability

Figure 7:
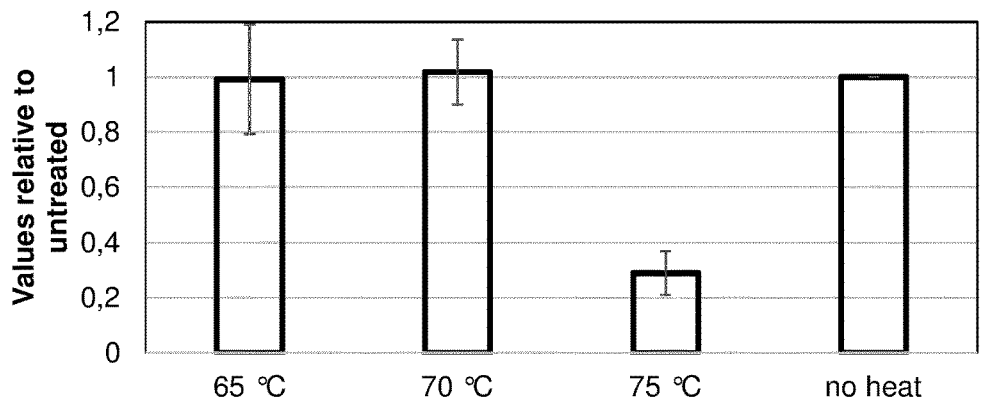
FIG. 7: Panel A) shows the results of the thermostability of homodivalent protein constructs. Panel B) shows the results of the pH stability of the homodivalent protein constructs. Panel C) shows the results of the bile salt stability of the homodivalent protein construct.
Figure 7:
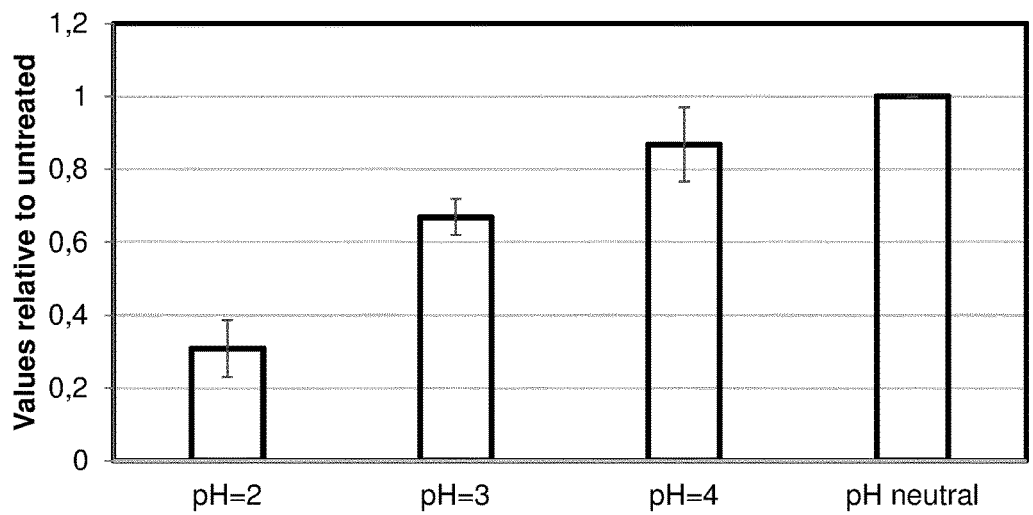
Figure 7:
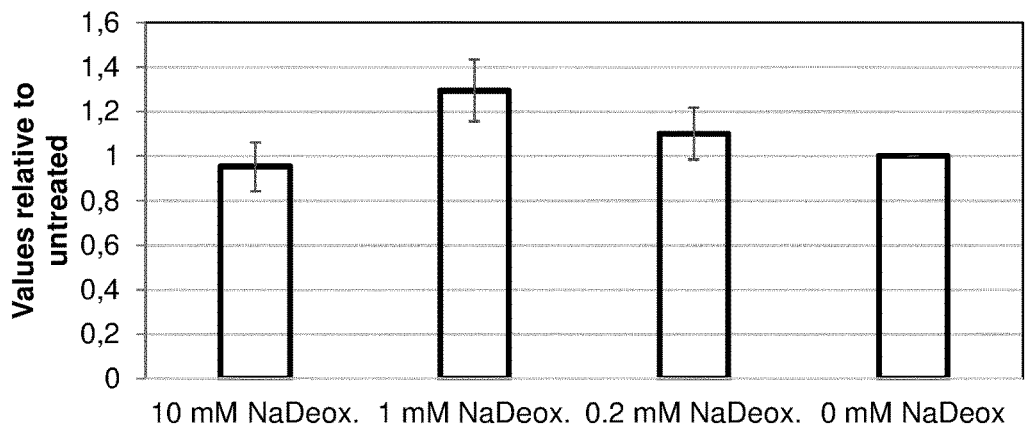

Thermostability is evaluated based on incubation of F45::(GGGGS)$_3$::F45 homodivalent protein construct for 1 hour at different temperatures, followed by evaluation of product binding in an ELISA setup, relative to a control (see FIG. 7A).

We can conclude that the homodivalent protein construct is completely stable until 70° C. indicating high product stability.

pH Stability pH stability is evaluated based on incubation of F45::(GGGGS)$_3$::F45 homodivalent protein construct for 1 hour at 37° C. at different pH, followed by evaluation of product binding in an ELISA setup, relative to a control (see FIG. 7B).

We can conclude that the homodivalent protein construct gradually loses stability as pH is lowered, yet between pH 3-4~70-90% of activity is retained, and the divalent protein constructs is able to pass through the stomach of a subject, such as an animal and retain biologically relevant activity.

Bile Salt Stability

Sodium deoxycholate (NaDeox) is a bile salt and was added in the step where bacteria bind the F45::(GGGGS)$_3$::F45 homodivalent protein construct coated in the well. NaDeox was added at concentrations 0.2 mM, 1 mM and 10 mM to evaluate their effect on bacteria-product binding. After incubation, the plate was washed and processed as described above.

The effect on product-bacteria binding in bile salts is evaluated based on incubation of F45::(GGGGS)$_3$::F45 construct for 1 hour at different concentrations of NaDeox with bacteria in an ELISA setup, values are represented relative to a control (see FIG. 7C).

We can conclude that the homodivalent protein construct remains completely stable and active under the presence of bile salt (also outside of biologically relevant range) and therefore will be active in the intestines.

Stability in Pig Gastric Juice Over Time

Gastric juice was extracted from the stomach from euthanized pigs (Yorkshire Landrace at an approximate weight of 30 kg). Within 1-2 hours after extraction, the gastric juice was cleared by centrifugation, and then kept at −80° C. until further use. When pre-treating untagged F45::(GGGGS)$_3$::F45 homodivalent protein construct samples were diluted 1:200 in gastric juice, pH was measured, and for one sample pH was adjusted to approximately 3 with HCl. Samples subsequently incubated at 37° C. for 1 h and were then diluted further and used for coating the ELISA plate. For all treatments all subsequent steps were processed as described in Example 3 (ELISA).

Figure 8:
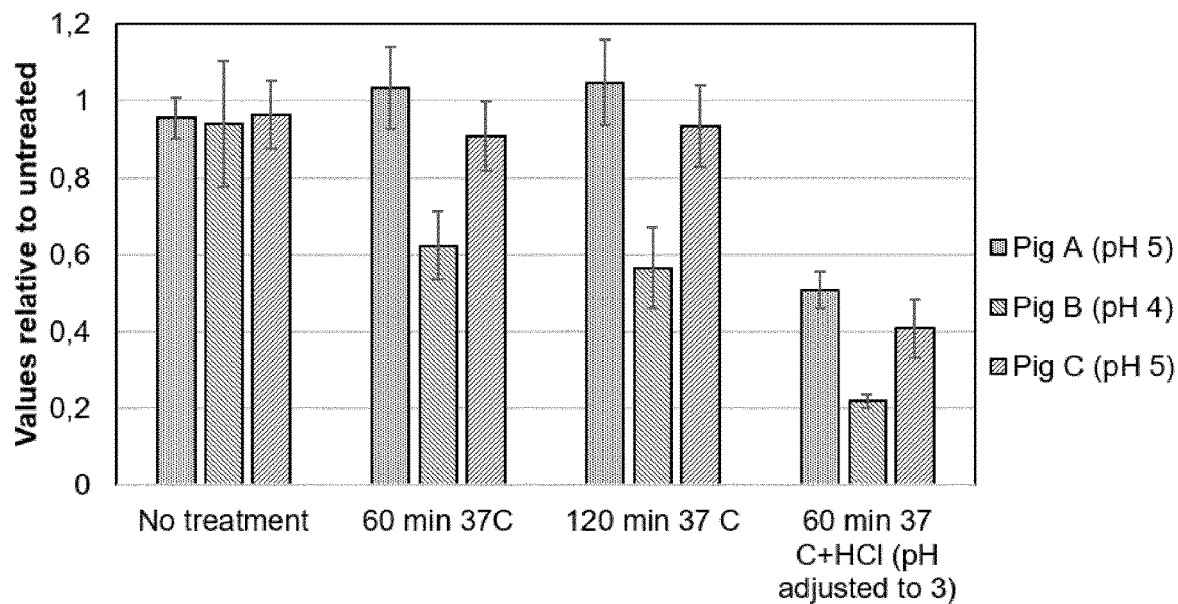
FIG. 8: Panel A) shows the results from stability tests of homodivalent protein constructs under exposure of gastric juice. For one sample pH was adjusted to approximately 3 with HCl. Samples were incubated at 37° C. for 60 min or 120 min. Panel B) shows the results from stability tests of homodivalente protein constructs exposed to pig gall over time. The pig gall was mixed with bacteria and BSA to a final gall concentration of 50%, 10% or 2%.
Figure 8:
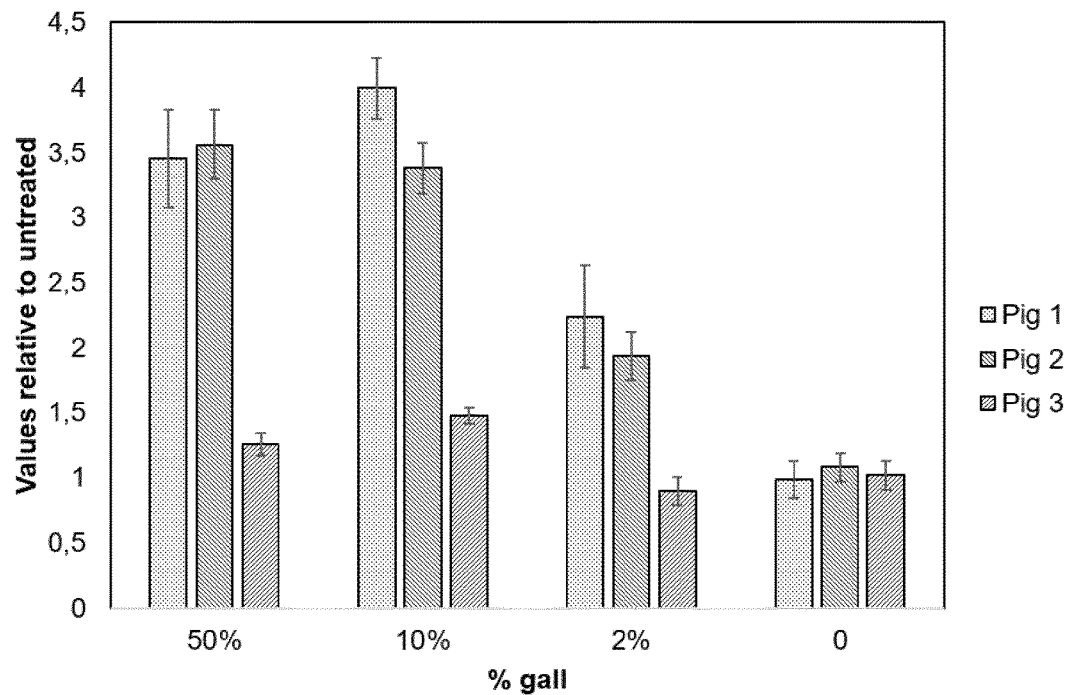

Product stability in pig gastric juice is evaluated based on incubation of F45::(GGGGS)$_3$::F45 homodivalent protein construct for 1 hour at 37 C with stomach content from three different piglets, followed by evaluation of product binding in an ELISA setup, relative to a control. pH=4/5, and the last sample adjusted to 3 with HCl (see FIG. 8A).

We can conclude that homodivalent protein construct remains stable in the gastric juice of piglets, and therefore should retain activity when dosed orally.

Stability in Pig Gall Over Time

Gall was extracted from the gall bladder from pigs (Yorkshire Landrace obtained from a specific pathogen free herd and euthanized at an approximate weight of 30 kg). Gall was kept on ice/refrigerated until further use. Before use, gall was heated briefly at 37° C. to dissolve lipids. High levels of gall made the milk precipitate so for these assays BSA (final concentration 3%) was used to in buffers and blocking buffers. Gall was mixed with bacteria and BSA to a final gall concentration of 50%, 10% or 2%. After gall/bacteria incubation, the plate was washed and processed as described above.

The effect of product-bacteria binding in pig gall is evaluated based on incubation of F45::(GGGGS)$_3$::F45 and bacteria (F4 ETEC) for 1 hour at different concentrations of gall from 3 separate piglets, followed by evaluation of product binding in an ELISA setup, relative to a control (see FIG. 8B).

We can conclude that the homodivalent protein construct remains stable and active in gall, and will therefore retain function in the intestines.

Overall Conclusion

We can conclude that the homodivalent protein construct is completely stable, within the temperature ranges relevant for humans and animals. The homodivalent protein construct retains biologically relevant activity when pH is lowered and it remains completely stable and active under the presence of bile/gall, it will therefore be active in the intestines. The homodivalent protein construct also remains stable in gastric juice of piglets, and therefore retains activity when dosed orally.

Example 6: In Vitro Test of Protease Stability of Single-Domain Antibody Constructs at Specific Concentrations and pH In order to ensure the stability of the single-domain antibody constructs when administered orally, stability test with addition of proteases were performed. The following monomeric single-domain antibodies; F41, F45, F183, and the following bivalent single-domain antibody constructs; F183::(GGGGS)$_3$::F183, F183::IgG3::F183 were used. The latter linker sequence has previously been used by Virdi et al. 2013 (Orally fed seeds producing designer IgAs protect weaned piglets against enterotoxigenic *Escherichia coli* infection) and has been described to be stable. The single-domain antibody constructs were each incubated 1 h at 37° C. with the following:

Pepsin: an endopeptidase found in the digestive system
Trypsin: a serine protease found in the digestive system
Pancreatin: a mix of amylase, lipase, and protease obtained from the pancreas of pigs
Gastric juice from a pig The proteases and gastric juice were chosen to determine the possible stability in the gastrointestinal tract when the single-domain antibody constructs are administered orally at later stages.

The stability tests were performed with the proteases at different concentrations and pH. The samples containing the single-domain antibody constructs were analyzed with SDS-page both before and after the incubation with proteases, to evaluate possible protein degradation. Bovine serum albumin (BSA) was used as reference for normal protein content.

Figure 2:
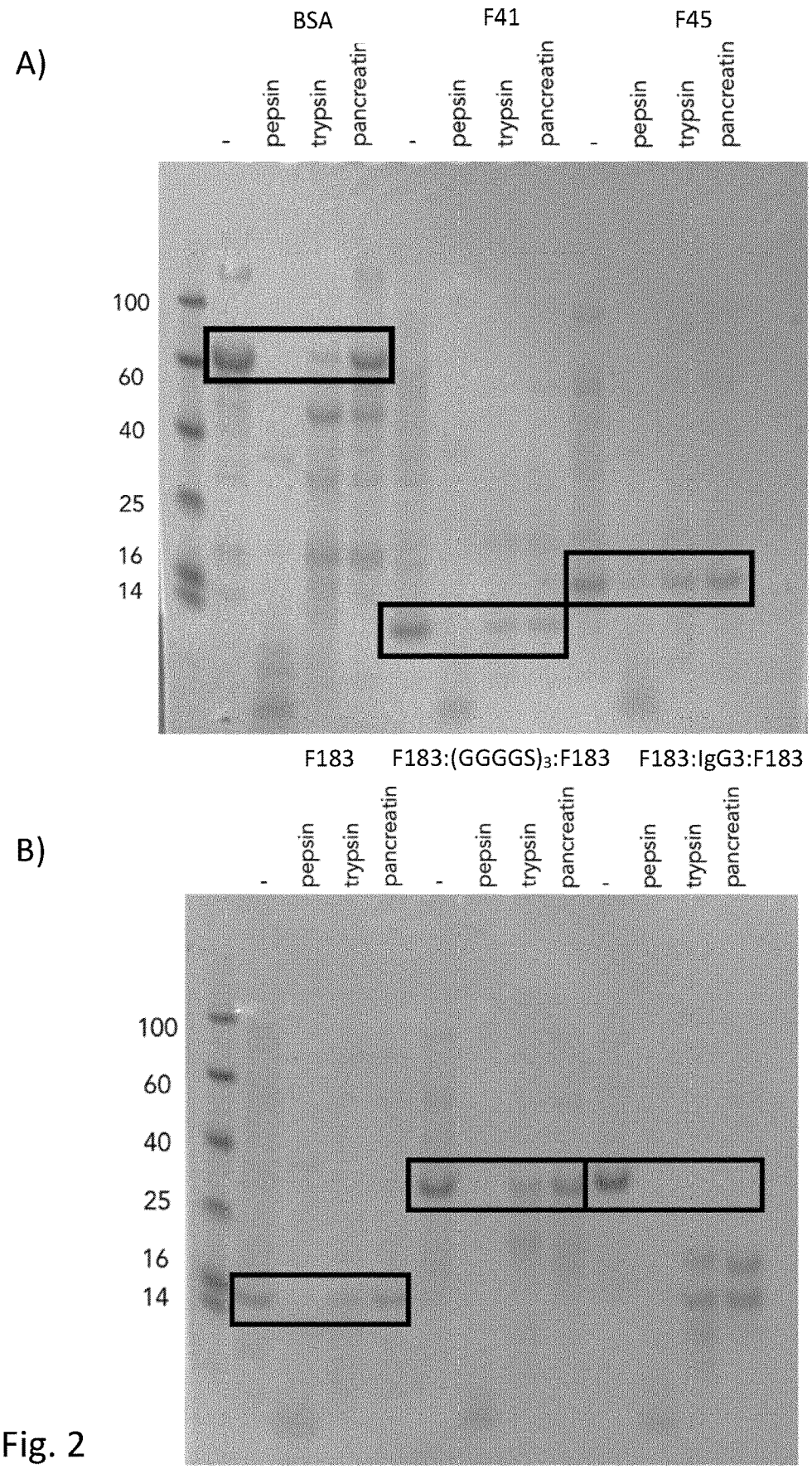
FIG. 2: Results from stability tests under conditions with high protease concentration and low pH are visualised on standard SDS gels. Bands of product are marked by a box.
Figure 3:
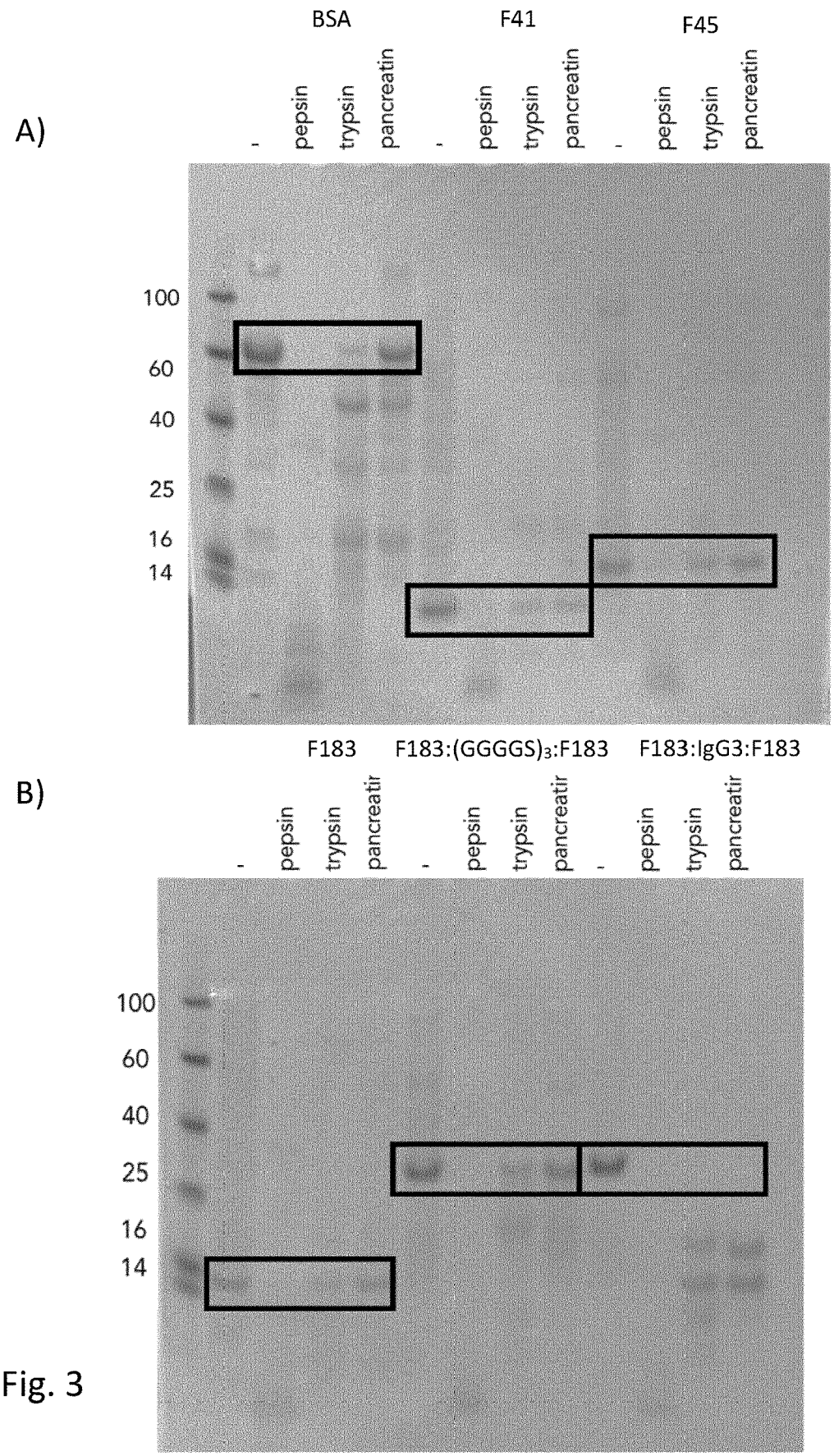
FIG. 3: Results from stability tests under conditions with very high protease concentration and low pH are visualised on standard SDS gels. Bands of product are marked by a box.
Figure 12:
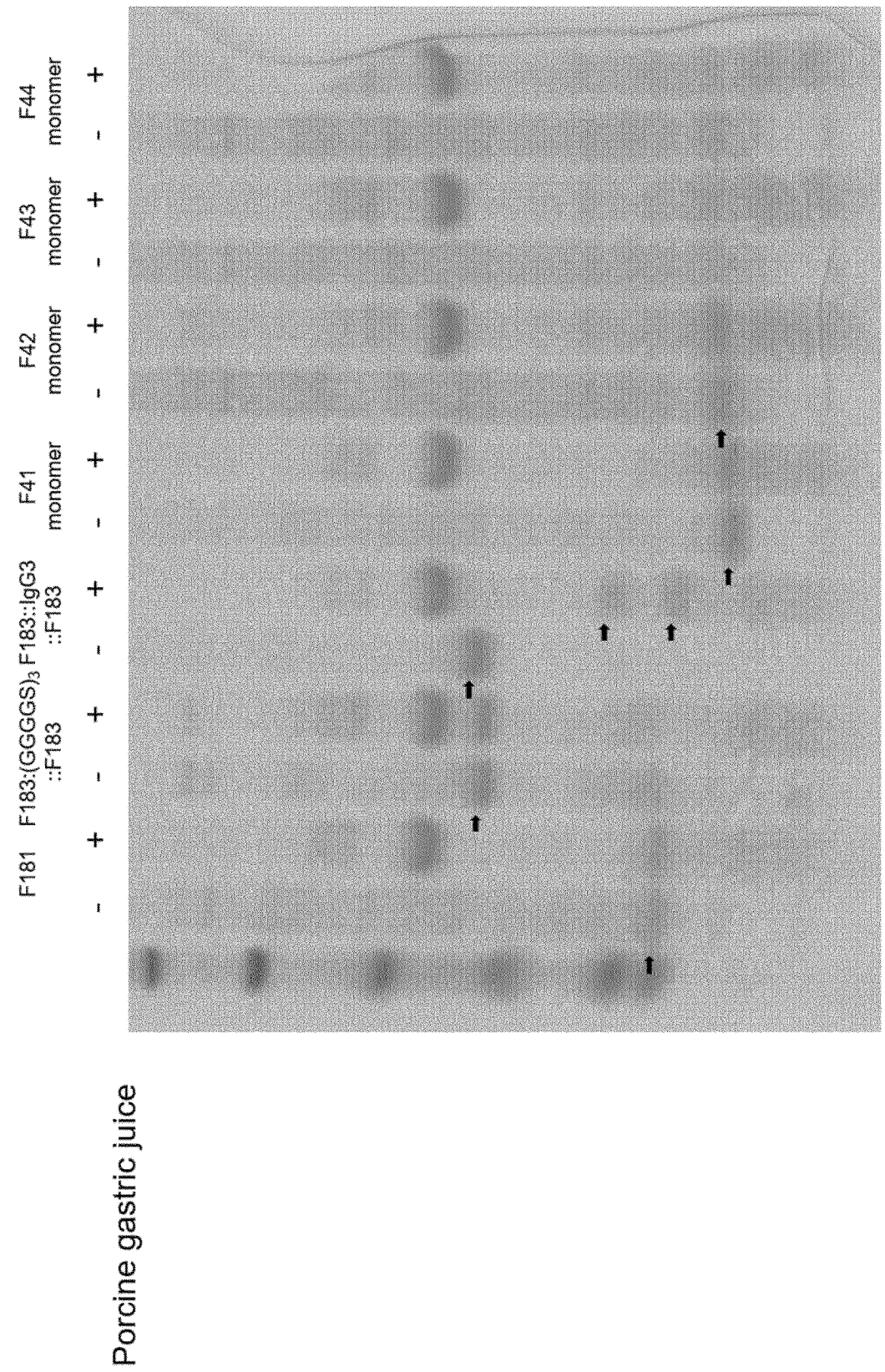
FIG. 12: Results from stability tests under conditions similar to those in the gastrointestinal tract using pig gastric juice are visualised on standard SDS gels. Bands of product are marked by arrows.

The specific protease concentrations and pH used were as follows:

Stability test at normal activity (FIG. 1):
Pepsin 250 ug/mL (incubation pH 3)
Trypsin 125 ug/mL
Pancreatin 100 ug/mL
Stability test at high activity (FIG. 2):
Pepsin 500 ug/mL (incubation pH 1-2)
Trypsin 250 ug/mL
Pancreatin 100 ug/mL
Stability test at very high activity (FIG. 3):
Pepsin 50 ug/mL (incubation pH 1-2)
Trypsin 500 ug/mL
Pancreatin 150 ug/mL In the stability tests under conditions similar to those in the gastrointestinal tract, all single single-domain antibody constructs as well as the homodivalent single-domain antibody construct F183::(GGGGS)$_3$::F183 were stable. However, the other homodivalent single-domain antibody construct F183::IgG3::F183 was degraded by both trypsin and pancreatin and lighter products are visible on the SDS-gel. Thus, surprisingly the IgG3 linker is degraded by the two proteases trypsin and pancreatin, while the (GGGGS)$_3$ linker remains completely stable. The same surprising pattern was observed after incubation in gastric juice from pigs; where the homodivalent construct with the IgG3 linker is cleaved, while the homodivalent construct with the (GGGGS)$_3$ linker remain stable (FIG. 12).

At high and very high concentration of the proteases and lower pH, larger amounts of the single-domain antibody constructs were degraded in general. When comparing the single single-domain antibody constructs, a difference in stability was observed as F41 was less degraded by pepsin and more by trypsin and pancreatin, whereas the opposite was observed for F45 at high concentrations of proteases. Furthermore, at very high concentrations, F45 was more stable than F41. F45 and F183 were similar with regard to stability for all conditions.

Example 7: In Vitro Test of Bacterial Aggregation

Material and Method:

F4 *E. coli* (0149:F4) O/N culture were grown in LB at 37° C. at shaking 180 rpm O/N. The culture subsequently was washed in PBS once, and OD600 adjusted to 1.1 mL bacteria were pelleted and resuspended in 40 ul of approximately 600 ng/mL tagged or untagged, F45 single-domain antibody or homodivalent F45::(GGGGS)$_3$::F45 homodivalent protein construct. Samples were left to precipitate for a couple of minutes and were then mounted on a glass slide. Images were taken using the 100× oil lens on a light microscope.

Figure 9:
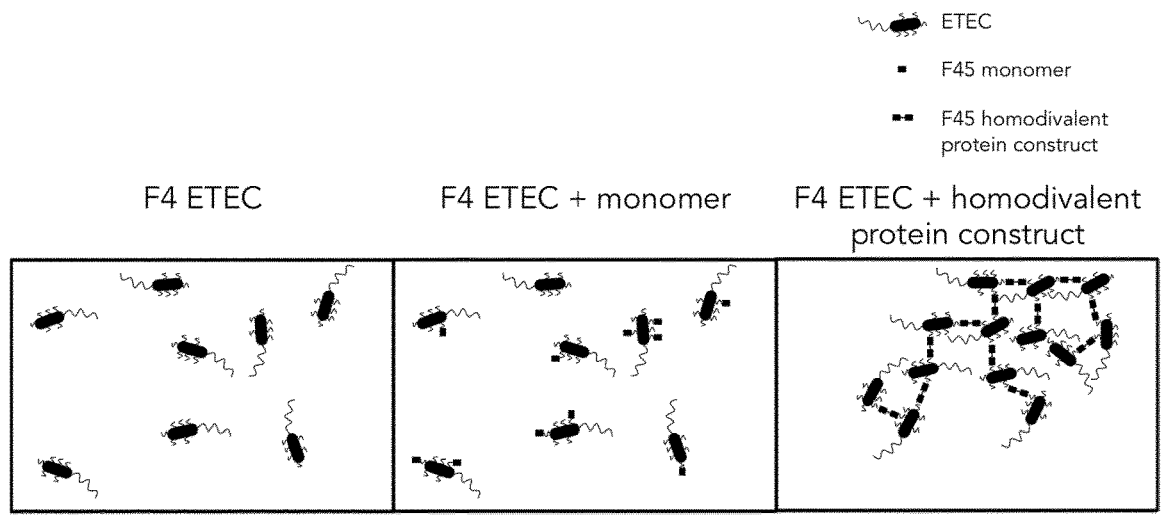
FIG. 9: Panel A) is a schematic presentation and panel B) shows images taken using a light microscope. Both Panel A) and panel B) show F4 ETEC bacteria without addition of any monomers or divalent protein constructs, F4 ETEC bacteria with F45 monomers and F4 ETEC bacteria with F45 homodivalente protein constructs linking F4 ETEC bacteria together.
Figure 9:
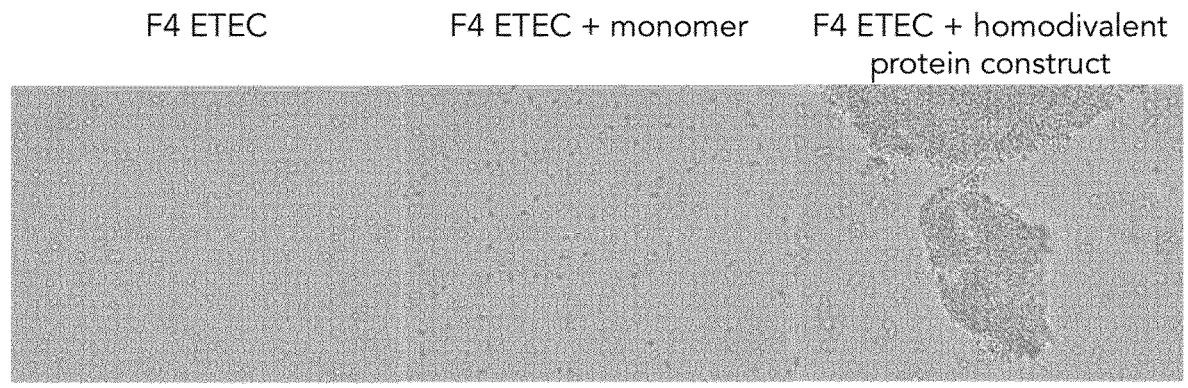

Results:

Microscopy pictures of F4 ETEC bacterial culture with and without F45 monomer or F45::(GGGGS)$_3$::F45 products, show how the products affect the bacteria. While F45 does not affect bacterial aggregation or motility, the homodivalent protein construct F45::(GGGGS)$_3$::F45 interlinks the F4 ETEC and organize them in aggregates, which visually show as bacterial clumps when viewed in the microscope (see FIG. 9).

Conclusion

Based on these pictures we can conclude that the homodivalent protein construct is active, bind in both ends, and have a cumulative effect of more than the two separate single-domain antibodies they are comprised of, as they will facilitate aggregate formation and block multiple more binding sites.

Example 8: In Vitro Test of Binding of Single-Domain Antibody Constructs to ETEC Bacteria and Competition with Cell Receptor Adhesion assays may be set up in order to test binding of single-domain antibody monomers or constructs and competition with natural receptors. This assay may demonstrate efficacy of the product to sequester ETEC bacteria from binding to porcine epithelial cells. Intestinal Porcine Epithelial Cell line-1 (IPEC-1) may be seeded, cultured and subsequently infected with F18$^+$ ETEC bacteria to mimic the binding between cells and bacteria in the gut. ETEC bacterial cells can be stained with DAPI for visualization and also measured using flowcytometry. In order to quantify bacterial load, unstained bacterial cells can be incubated with porcine cells for assays measuring colony-forming units. To investigate whether the single-domain antibody constructs block adhesion of ETEC bacteria cells to IPEC-1 cells and thus, competing with cell receptors, the adhesion assays may be performed with and without the addition of single-domain antibody constructs. Single-domain antibody monomers, constructs, mixes of monomers and/or constructs, or any of these may be tested after treatment with proteases, low pH, or gastric juice (as described in example 3). The single-domain antibody monomers or constructs bind to the F18$^+$ ETEC bacteria preventing the binding of IPEC-1 cells. An additional assay, investigating the adherence of F4$^+$ ETEC bacteria to the IPEC-J2 cell line expressing F4, with and without the presence of single-domain antibody monomers or constructs, may be performed as well.

The assays are performed to determine one or more of the following effects:
1. The potential higher efficacy of using a mix of multiple single-domain antibody constructs for sequestration of ETEC adherence to porcine epithelial cells compared to single single-domain antibody monomers or constructs.
2. The potential similar or higher efficacy of divalent constructs compared to single-domain antibody monomers.
3. The potential similar or higher stability of divalent constructs compared to single-domain antibody monomers after treatment with biologically relevant proteases from the digestive tract, low pH or gastric juice from pigs (as described in example 3), measured as retained activity of the constructs in an adhesion assay after treatment.

Example 9: Cytotoxicity Assays for Determining Toxicity of LT and stx2e and the Effect of Toxin Specific Single-Domain Antibody Constructs for Sequestration of Toxin Binding Cytotoxicity assays may be performed to determine the toxicity of the ETEC toxins LT and stx2e, and the ability of single-domain antibody constructs to abrogate this toxicity by toxin sequestration. Cells exposed to a cytotoxic compound can respond in numerous ways; if the toxin is lethal the cell may undergo necrosis, apoptosis, or autophagy, or if the insult is less serious, the cells may decrease or stop their growth and proliferation. Any of these responses may be measured in the presence of LT and stx2e during an in vitro cytotoxicity assay. Vero cells, a cell line established from kidney epithelial cells extracted from an African green monkey, may be used for this study.

The cells can be exposed to different/increasing concentrations of LT and stx2e and the cell response may be measured afterwards in order to determine the severity of the two toxins. In this study, single-domain antibody monomers, constructs, mixes of these, or any of these may be tested after treatment with products such as proteases, low pH, or gastric juice (as described in example 3). It is expected that the single-domain antibody constructs will sequester the toxins and thus inhibit the cytotoxic effect of the ETEC toxins LT and stx2e. The cytotoxicity assay can be performed with mixes of toxins obtained from the supernatant of ETEC bacteria. The effect may be dose dependent.

The assays are performed to determine one or more of the following effects:
1. The potential higher efficacy of using a mix of multiple single-domain antibody constructs for sequestration of toxic effect from toxins compared to single single-domain antibody monomers or constructs.
2. The potential similar or higher efficacy of divalent constructs compared to single-domain antibody monomers.
3. The potential similar or higher stability of divalent constructs compared to single-domain antibody monomers after treatment with biologically relevant proteases from the digestive tract, low pH, or gastric juice from pigs (as described in example 3), measured as retained activity of the constructs in the cytotoxicity assay after treatment.

Example 10: In Vitro Test of Binding of Single-Domain Antibody Constructs to ETEC Bacteria and Competition with Cell Receptor on Pig Intestinal Villi To show the effect of single-domain antibodies on ETEC villi binding, small intestinal villous enterocytes may be isolated from the gut mucosa of newly slaughtered piglets.

The villi may be incubated with ETEC bacteria in the presence and absence of single-domain antibody constructs, and the number of adhering bacteria will be determined using phase-contrast microscopy and immunohistochemistry. single-domain antibody monomers, constructs, mixes of these, or any of these may be tested after treatment with products such as proteases, low pH, or gastric juice (as described in example 3). Addition of single-domain antibody monomers or constructs prior to incubation with ETEC bacteria can sequester ETEC bacteria from adhering and will show the efficacy of the product.

The assays are performed to determine one or more of the following effects:
1. The potential higher efficacy of using a mix of multiple single-domain antibody constructs for sequestration of adherence to pig intestinal villi compared to single single-domain antibody monomers or constructs.
2. The potential similar or higher efficacy of divalent constructs compared to single-domain antibody monomers.

3. The potential similar or higher stability of divalent constructs compared to single-domain antibody monomers after treatment with biologically relevant proteases from the digestive tract, low pH, or gastric juice from pigs (see example 3), measured as retained activity of the constructs in their ability to sequester adherence of ETEC bacteria to pig intestinal villi after treatment.

Example 11: In Vitro Homodivalent Protein Construct Effect on ETEC Binding to Pig Villous Enterocytes Material and Method Isolation of intestinal villous enterocytes from piglets and the subsequent adhesion assay was performed as described in Van den Broeck et al. (1999). Briefly, a 15-20 cm long intestinal segment was excised from the mid jejunum of a pig (Yorkshire-Landrace obtained from a specific pathogen-free herd and euthanized at an approximate age of 3-4 months). The segment was opened and washed in Krebs-Henseleit buffer (120 mM NaCl, 14 mM KCl, 25 mM $NaHCO_3$, 1 mM KH2PO4 [pH 7.4]) and then kept in Krebs Henseleit buffer containing 1% formaldehyde for approximately 1 hour. Subsequently, the buffer was changed to sterile PBS (pH 7.4), the villi were gently scraped from the mucosae with a glass slide and suspended and washed in sterile PBS (pH 7.4) buffer until the supernatant was clear. The sample was stored in PBS and kept at 4° C. until further use.

$F4_+$ E. coli (0149:F4) was inoculated from a single colony and grown overnight with shaking in LB at 37° C. Bacteria were washed once in PBS (pH 7.4), and pretreated with a solution containing: untagged or tagged F45::(GGGS)$_3$::F45 homodivalent protein construct, F183::(GGGS)$_3$::F183 homodivalent protein construct. The bacteria/F45::(GGGS)$_3$::F45 mix or bacterial/F183::(GGGS)$_3$::F183 mix was added to a slurry of villous material, and the adhesion was left to occur at room temperature under gentle rotation. After an hour, samples were mounted on a glass slide and images were taken using the 100× oil lens on a light microscope, and quantification was performed manually based on images taken from the microscope.

Figure 10:
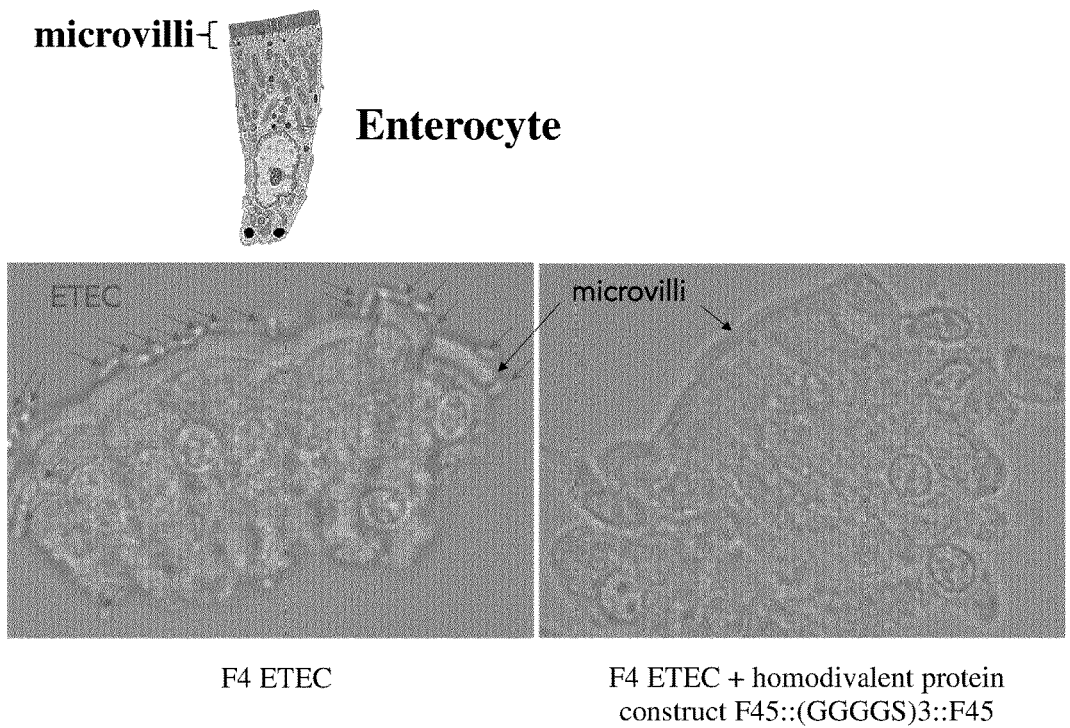
FIG. 10: The upper part of panel A) shows an enterocyte as well as its microvillus on the upper surface. The lower part of panel A) shows isolated intestinal villous enterocytes from piglets with F4 ETEC bacteria, indicated by the arrows in the left image. The right image shows that F4 ETEC bacteria is not able to bind to the microvillus of the enterocyte when F45::(GGGS)$_3$::F45 homodivalent protein construct are present. Panel B) shows the efficacy of blocking F4 ETEC binding to pig villous enterocytes. The efficacy is quantified by counting occurrence of enterocytes with 0, 1, or 2+ F4 ETEC cells bound compared to relevant controls. 1 is included as floating bacteria may be captured under the cover glass when performing microscopy. % of enterocytes with 1 or 2+ ETEC cells bound show the efficacy of bacterial infection on enterocytes. F183::(GGGS)$_3$::F183 homodivalent protein construct is used as a specificity control.
Figure 10:
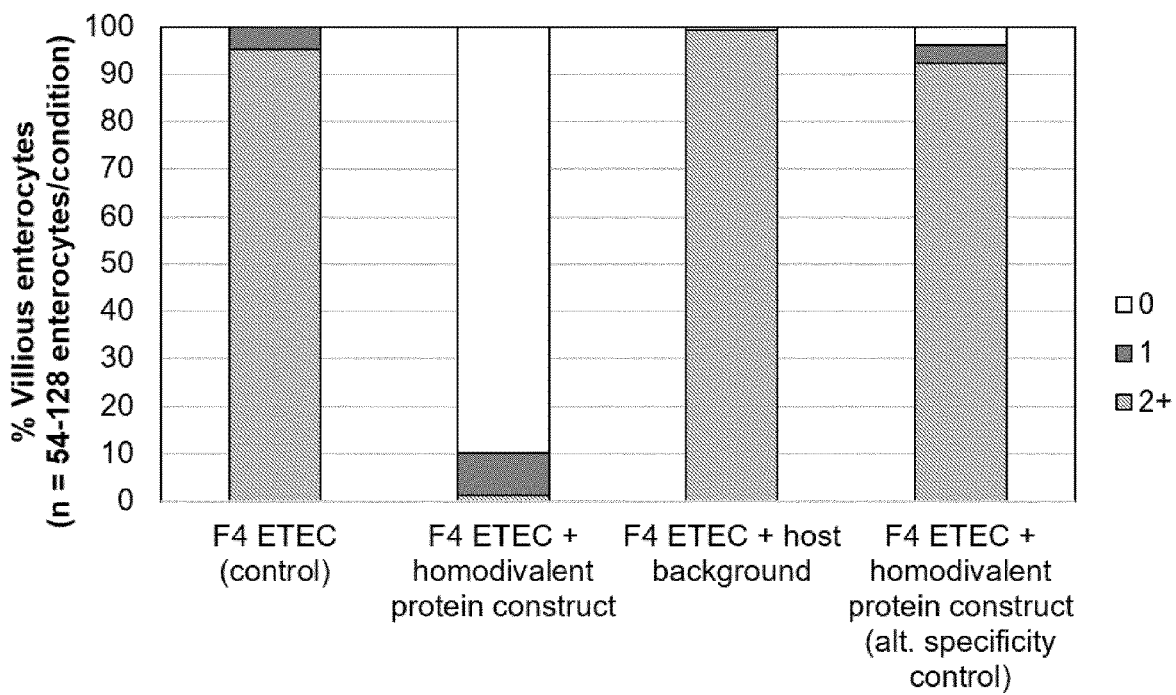

Results:

Efficacy of product for blocking F4 ETEC binding to pig villous enterocytes is quantified by counting occurrence of enterocytes with 0, 1, or 2+ F4 ETEC cells bound compared to relevant controls. 1 is included as floating bacteria may be captured under the cover glass when performing microscopy. % of enterocytes with 1 or 2+ ETEC cells bound show the efficacy of bacterial infection on enterocytes. As such a higher percentage=high degree of bacterial adhesion. F4 ETEC+F183::(GGGS)$_3$::F183 is a control. See FIG. 10.

Conclusion

It is concluded that as F45::(GGGS)$_3$::F45 homodivalent protein construct is added, the adhesion of F4 ETEC to the enterocytes is almost completely stopped, as the homodivalent protein construct blocks binding of the bacteria to the enterocytes.

Example 12: FIDA to Determine Binding of Single-Domain Antibodies and their Divalent Constructs To determine binding and complex formation between single-domain antibodies and their divalent single-domain antibody constructs and an analyte, flow induced dispersion analysis (FIDA) can be performed as described in Poulsen et al. 2015 (Flow Induced Dispersion Analysis Rapidly Quantifies Proteins in Human Plasma Samples). All mentioned single-domain antibodies and their divalent single-domain antibody constructs can be analyzed to document and quantify analyte binding, including $K_d$ and complex formation Single-domain antibody monomers, constructs, mixes of these, or any of these may be tested after treatment with proteases, low pH, or gastric juice (as described in example 5). It is expected that a shift in the hydrodynamic radius is observed and thus, confirming binding of analyte. Multiple shifts in hydrodynamic range illustrate the binding of multiple analytes to the single-domain antibody construct confirming higher order complex formation. Similarly, the analysis can illustrate how increased binding is achieved for divalent constructs due to increased avidity.

Example 13: Flow-Induced Dispersion Analysis (FIDA)

Material and Method:

FIDA enables characterization and quantification of proteins under native conditions. FIDA is based on measuring the change in size of a ligand as it selectively interacts with the target protein. The unbound ligand has a relatively small apparent hydrodynamic radius (size), which increase in the presence of the analyte due to binding to the analyte. Prior to FIDA measurement the $V_HH$ antigens (LT-B or FaeG) were fluorescently labelled using the Atto 488 Protein Labeling Kit (Sigma-Aldrich) using the standard protocol.

FIDA quantification of binding between FaeG and F45 monomer as well as FaeG and F45::(GGGGS)$_3$::F45 homodivalent protein construct FIDA quantification was performed using 39 nL of Atto labelled FaeG (100 nM), and 7 μL fermentation media containing the monomer and the homodivalent protein construct. Hydrodynamic radius was detected at 488 nm through detection of fluorescence of FaeG-atto488. For mixed samples, they were pre-incubated with varying concentrations of fermentation media (0 and 50% v/v) for both monomer and bivalent constructs.

FIDA quantification of binding between LT-B and LT1 monomer as well as LT-B and LT1::(GGGGS)$_3$::LT1 homodivalent protein construct FIDA quantification was performed using 39 nL of Atto labelled LT-B (100 nM), and 7 μL fermentation media containing the monomer and the homodivalent protein construct. Hydrodynamic radius was detected at 488 nm through detection of fluorescence of LT-B-atto488. For mixed samples they were pre-incubated with varying concentrations of fermentation media (0-12.5% v/v) for both monomer and bivalent constructs. LT specific LT1 monomer and homodivalent protein construct had prior to the experiment been treated with endoH (NEB, P0702) to remove a known glycosylation.

FIDA results were analyzed using the FIDA-tech software, used for calculation of binding affinity and visualization of binding curves.

Results:

FaeG

The hydrodynamic radius of free FaeG was determined, and monomer F45 (SEQ ID NO:10) or F45::(GGGGS)$_3$::F45 homodivalent protein construct (SEQ ID NO:13) was added to evaluate binding affinity. The hydrodynamic range is a measured as the broadness of the peak produced when measuring a sample using FIDA. A narrow peak is antigen with no product bound, and the peak will broaden (and the hydrodynamic range increase), when product binds. As such, a higher number indicates product binding, and the higher the values the higher the affinity of the product (see Table 1 below).

TABLE 1

| Fermentation media content (v/v) | Hydrodynamic radius (nm) |
|---|---|
| 0% | 2.40 +/− 0.09 |
| 50% F45 | 3.02 +/− 0.06 |
| 50% F45::(GGGGS)$_3$::F45 | 2.97 +/− 0.20 |

Based on FIDA measurement we can conclude that both F45 single-domain antibodies and F45::(GGGGS)$_3$::F45 homodivalent protein constructs bind FaeG (see table 1). Interestingly, when correlated for difference in concentration it can be concluded that the homodivalent protein construct binds with higher affinity compared to a single-domain antibody.

LT-B

Figure 6:
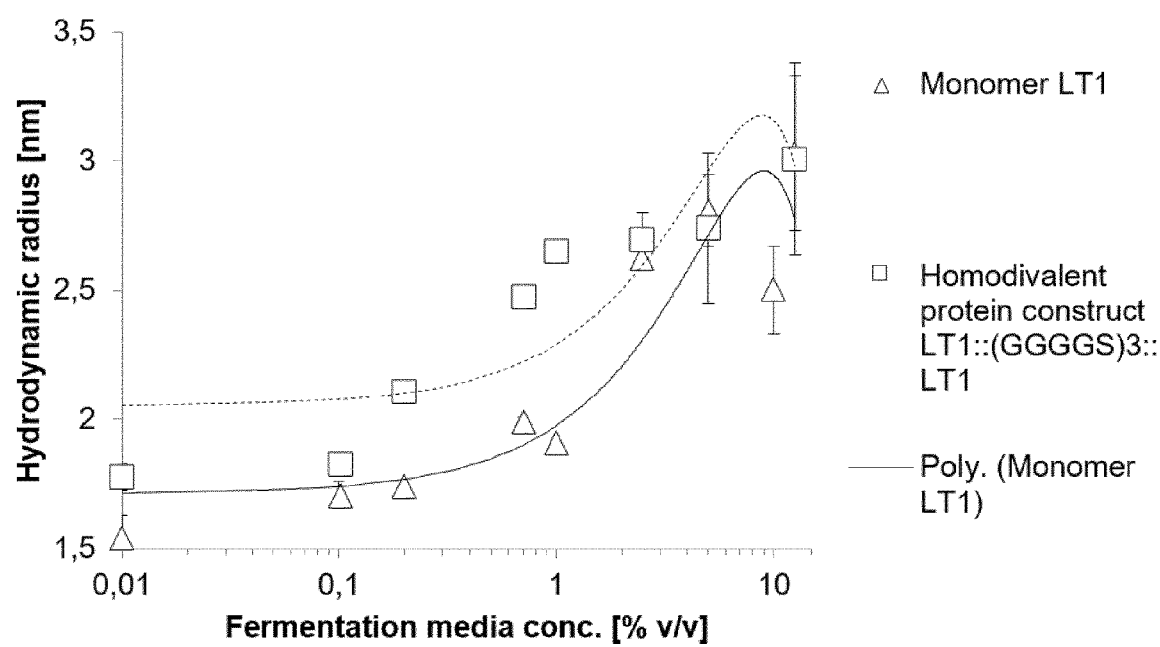
FIG. 6: Results from the Flow-Induced Dispersion Analysis (FIDA) of free LT-B as well as it interactions with LT1 monomer and LT1 homodivalent protein construct.

The hydrodynamic radius of free LT-B was also determined, and LT1 monomer (SEQ ID NO:9) or LT1::(GGGGS)$_3$::LT1 homodivalent protein construct (SEQ ID NO:15) was added to evaluate binding affinity (see FIG. 6). The homodivalent protein construct showed a higher hydrodynamic radius, thus demonstrating a higher binding affinity for the homodivalent protein construct compared to the single-domain antibody.

Conclusion

In both experiments, the homodivalent protein constructs, F45::(GGGGS)$_3$::F45 and LT1::(GGGGS)$_3$::LT1, showed a higher binding affinity compared to the corresponding F45 and LT1 monomers.

Example 14: In Vivo Treatment of Post-Weaning Diarrhoea in F4$^+$ Piglets

An in vivo study may be conducted to determine the effect of single-domain antibody constructs for treatment of post-weaning diarrhoea (PWD) in piglets. F4$^+$ piglets may be challenged with F4$^+$ ETEC bacteria in order to induce PWD. In the study, three technical replicates of 8 piglets may be performed, and each technical replicate is divided into four groups of two piglets; one group will be a control (no treatment), one group will be treated with single-domain antibody construct product, one group will be challenged with F4$^+$ ETEC bacteria, and the last group will be treated with single-domain antibody construct product and challenged with F4$^+$ ETEC bacteria. Single-domain antibody monomers, constructs, mixes of these, or any of these may be tested after treatment with proteases, low pH, or gastric juice (as described in example 3). Treatment can be from two days before weaning until 12 days after and challenge will be on day one and two after weaning. The disease progression may be determined from measurements, including degree of diarrhoea, weight, food intake, fever, clinical manifestations, and analysis of biomarkers for inflammation from blood samples. It is expected that the treatment with single-domain antibody constructs may reduce or inhibit progression of PWD on all or some of the measured parameters and possibly show a curative effect in the piglets. The study may be conducted multiple times for comparison of the effect of different combinations of single-domain antibody constructs. Hereby, we may show the efficacy of the product in vivo with improvements on parameters, such as degree of diarrhoea, weight gain, feed intake and other disease markers, when compared to an untreated F4$^+$ ETEC bacteria challenged piglet.

Example 15: In Vivo Treatment with Homodivalent Protein Construct of Post-Weaning Diarrhoea in F4$^+$ Piglets Material and Method:

Sows (N=5), genetically characterized F4$_+$ E. coli susceptible from Aarhus University, Foulum, were used in this study, and were fed a standard Danish sow diet (based on wheat, barley and soybean meal). Litters were born on the 26. (Litter 1=11 piglets; Litter 2=8 piglets, and Litter 3=5 piglets), 27. (Litter 4=10 piglets), and 31. of January, 2019 at AU-Foulum. At weaning (d 28 of age) piglets (N=32 in total) enrolled a challenge study with F4$_+$ E. coli inoculation. The same feed was provided for all pigs from 3 weeks of age (while suckling) and until end of the experiment (5 weeks of age). The feed (a standard commercial mixture) was fed twice a day (semi-ad lib) to the pigs and water was provided ad libitum.

The experimental design involved four treatments:
1) Control: No F45::(GGGGS)$_3$::F45 homodivalent protein construct and no F4,
2) Control: F45::(GGGGS)$_3$::F45 homodivalent protein construct and no F4,
3) No F45::(GGGGS)$_3$::F45 homodivalent protein construct and F4, and
4) F45::(GGGGS)$_3$::F45 homodivalent protein construct and F4.

At weaning, the piglets were housed in two rooms (similar climate conditions) in pens with 2 pigs in each pen giving a total of 16 pens, or four replicates of each group.

The 16 pens were distributed randomly between the 2 treatments; i.e. solutions of F45::(GGGGS)$_3$::F45 homodivalent protein construct and control (egg white protein/ Novo) provided by Bactolife. These solutions were provided to each pig two times daily starting during the afternoon on the day of weaning, and finishing 14 days after. The solutions were mixed with non-alcoholic beer (Hvidtol from Hancock). The trial lasted for 21 weeks (until d 49 of age).

On day 1 and 2 post weaning, piglets were challenged orally with E. coli (F4, 0149). The CFU of inoculum at inoculation was $1.05 \times 10^9$ and $1.72 \times 10^9$ CFU on day 1 and 2, respectively. Control pigs were inoculated with buffer (sodium bicarbonate). On day 0, 1, 2, 3, 4, 5 and 7 (and every second day during week 2, and every third day during week 3), a faecal sample (directly taken from the rectum) was taken from each pig, samples were analyzed for hemolytic and non-hemolytic bacteria. and E. coli was verified by serotyping. At the end of the trial, piglets were killed (no sampling).

Figure 11:
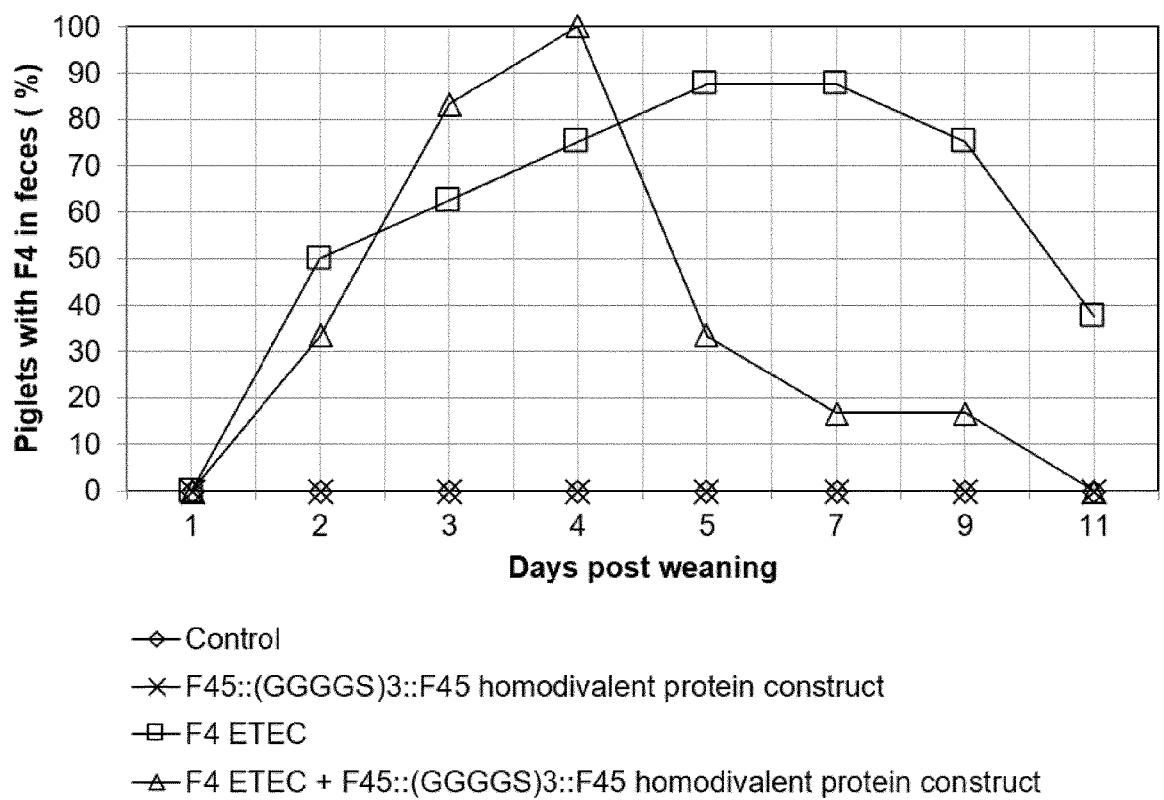
FIG. 11: Results from in vivo treatment with homodivalent protein construct of post-weaning diarrhoea in F4$^+$ piglets (N=32). The x-axis shows days post weaning. The y-axis shows the number of piglets with F4 bacteria in feces (%). Four groups were tested: 1) Control: No F45::(GGGGS)$_3$::F45 homodivalent protein construct and no F4, 2) Control: F45::(GGGGS)$_3$::F45 homodivalent protein construct and no F4, 3) No F45::(GGGGS)$_3$::F45 homodivalent protein construct and F4, and 4) F45::(GGGGS)$_3$::F45 homodivalent protein construct and F4.

Results:

In vivo challenge trials were performed with 30 piglets (6-8 per group) in a model system for post-weaning diarrhea. The results show presence of F4 ETEC in piglets feces throughout the trial. Presence of F4 ETEC in feces indicate active infection (especially in high numbers). The data generated show that after the piglets are challenged (day 1+2) the F4 ETEC bacteria are present, but rather than establishing an infection they are flushed out in piglets treated with F45::(GGGGS)$_3$::F45 homodivalent protein construct when compared to not treated. See FIG. 11.

Conclusion

As such, it can be concluded that the homodivalent protein construct prevents F4 ETEC bacteria from adhering in the gastrointestinal tract of newly weaned piglets and reduced the infection time markedly compared to no treatment.

REFERENCES

Gonzales, L.; Ali, Z. B.; Nygren, E.; Wang, Z.; Karlsson, S.; Zhu, B.; Quiding-Järbrink, M.; Sjöling, Å. Alkaline pH Is a Signal for Optimal Production and Secretion of the Heat Labile Toxin, LT in Enterotoxigenic *Escherichia coli* (ETEC). *PLoS One* 2013, 8, e74069

Harmsen, M. M.; Solt, C. B. Van; Bemmel, A. M. van Z.; Niewold, T. A.; Zijderveld, F. G. van Selection and optimization of proteolytically stable llama single-domain antibody fragments for oral immunotherapy. *Appl. Microbiol. Biotechnol.* 2006, 72, 544-551, doi:10.1007/s00253-005-0300-7.

Harmsen, M. M.; Solt, C. B. Van; Fijten, H. P. D. Enhancement of toxin- and virus-neutralizing capacity of single-domain antibody fragments by N-glycosylation. *Appl. Microbiol. Biotechnol.* 2009, 84, 1087-1094, doi:10.1007/s00253-009-2029-1.

Lo, A. W. H.; Moonens, K.; De Kerpel, M.; Brys, L.; Pardon, E.; Remaut, H.; De Greve, H. The molecular mechanism of Shiga toxin Stx2e neutralization by a single-domain antibody targeting the cell receptor-binding domain. *J. Biol. Chem.* 2014, 289, 25374-25381, doi:10.1074/jbc.M114.566257.

Moonens, K.; Kerpel, M. De; Coddens, A.; Cox, E.; Pardon, E.; Remaut, H.; Greve, H. De Nanobody Mediated Inhibition of Attachment of F18 Fimbriae Expressing *Escherichia coli*. *PLoS One* 2014, 9, e114691, doi:10.1371/journal.pone.0114691.

Van den Broeck, W.; Cox, E.; Godderiis, E. M. Receptor-Dependent Immune Responses in Pigs after Oral Immunization with F4 Fimbriae. *Infect. Immun.* 1999, 67, 520-526

Virdi, V.; Coddens, A.; Buck, S. De; Millet, S.; Maria, B.; Cox, E.; de Greve, H.; de Picker, A. Orally fed seeds producing designer IgAs protect weaned piglets against enterotoxigenic *Escherichia coli* infection. *PNAS* 2013, 110, 11809-11814, doi:10.1073/pnas.1301975110.

The invention claimed is:

1. An isolated protein comprising
   a first peptide;
   a second peptide; and
   a linker,
wherein said first and said second peptides bind at least one pathogen surface component and/or at least one molecule produced by a pathogen,
wherein:
   said first peptide is a single domain antibody comprising three complementarity determining regions CDR1, CDR2 and CDR3, wherein:
      CDR1 has an amino acid sequence comprising an amino acid sequence of SEQ ID NO: 27,
      CDR2 has an amino acid sequence comprising an amino acid sequence of SEQ ID NO: 29, and
      CDR3 has an amino acid sequence comprising an amino acid sequence of SEQ ID NO: 31, and
   said second peptide is a single domain antibody comprising three complementarity determining regions CDR1, CDR2 and CDR3, wherein:
      CDR1 has an amino acid sequence comprising an amino acid sequence of SEQ ID NO: 27,
      CDR2 has an amino acid sequence comprising an amino acid sequence of SEQ ID NO: 29, and
      CDR3 has an amino acid sequence comprising an amino acid sequence of SEQ ID NO: 31, and
   wherein said protein comprises an amino acid sequence according to SEQ ID NO:15 or an amino acid sequence having at least 90% identity to SEQ ID NO:15; or
   said first peptide is a single domain antibody comprising three complementarity determining regions CDR1, CDR2, and CDR3, wherein:
      CDR1 has an amino acid sequence comprising an amino acid sequence of SEQ ID NO: 28,
      CDR2 has an amino acid sequence comprising an amino acid sequence of SEQ ID NO: 30, and
      CDR3 has an amino acid sequence comprising an amino acid sequence of SEQ ID NO: 32, and
   said second peptide is a single domain antibody comprising three complementarity determining regions CDR1, CDR2, and CDR3, wherein:

CDR1 has an amino acid sequence comprising an amino acid sequence of SEQ ID NO: 28,
CDR2 has an amino acid sequence comprising an amino acid sequence of SEQ ID NO: 30, and
CDR3 has an amino acid sequence comprising an amino acid sequence of SEQ ID NO: 32, and
wherein said protein comprises an amino acid sequence according to SEQ ID NO:13 or an amino acid sequence having at least 90% identity to SEQ ID NO:13; or
said first peptide is a single domain antibody comprising an amino acid sequence according to SEQ ID NO: 5 or an amino acid sequence having at least 90% sequence identity to the amino acid sequence of SEQ ID NO: 5, wherein any sequence variance is outside the CDRs;
said second peptide is a single domain antibody comprising an amino acid sequence according to SEQ ID NO: 5 or an amino acid sequence having at least 90% sequence identity to the amino acid sequence of SEQ ID NO: 5, wherein any sequence variance is outside the CDRs; and
wherein said protein comprises an amino acid sequence according to SEQ ID NO:14 or an amino acid sequence having at least 90% identity to SEQ ID NO:14.

2. The protein according to claim 1, wherein the linker is a GS linker.

3. The protein according to claim 2, wherein said GS linker is of the structure $(G_xS)_n$, where x is a number between 1 and 10 and n refers to a number of repeats of the $G_xS$ sequence, where n is between 1 and 10.

4. The protein according to claim 1, wherein said protein comprises one or more further peptides binding to at least one pathogen surface component and/or at least one molecule produced by a pathogen.

5. The protein according to claim 1, wherein said first and said second peptides both comprise an amino acid sequence according to SEQ ID NO:10 or an amino acid sequence having at least 90% sequence identity to SEQ ID NO:10.

6. An isolated nucleic acid molecule encoding the protein according to claim 1, a vector comprising said nucleic acid molecule, or a recombinant host cell comprising said nucleic acid molecule or vector.

7. A dietary composition comprising a protein according to claim 1, wherein the dietary composition further comprises one or more prebiotics, probiotics, synbiotics, proteins, lipids, carbohydrates, vitamins, fibers, and/or nutrients.

8. A pharmaceutical composition comprising a protein according to claim 1, a nucleic acid molecule encoding said protein, a vector comprising said nucleic acid molecule, and/or a recombinant host cell comprising said nucleic acid molecule or vector.

9. A method for the prevention or treatment of a pathogen induced infection associated with an internal and/or external surface of a subject, comprising administering to said subject a protein according to claim 1, a nucleic acid molecule encoding said protein, a vector comprising said nucleic acid molecule, a recombinant host cell comprising said nucleic acid molecule or vector, and/or a pharmaceutical composition the protein, nucleic acid molecule, vector and/or recombinant host cell and further comprising one or more excipients.

10. The method according to claim 9, wherein the infection is a gastrointestinal infection.

11. The method according to claim 9, wherein the subject is a pig.

12. The method of claim 9, wherein said pathogen induced infection is post-weaning diarrhea (PWD) or Edema disease.

13. An isolated protein comprising
a first peptide;
a second peptide; and
a linker,
wherein said first and said second peptides bind at least one pathogen surface component and/or at least one molecule produced by a pathogen,
wherein:
said first peptide is a single domain antibody comprising three complementarity determining regions CDR1, CDR2 and CDR3, wherein:
CDR1 has an amino acid sequence comprising an amino acid sequence of SEQ ID NO: 27,
CDR2 has an amino acid sequence comprising an amino acid sequence of SEQ ID NO: 29, and
CDR3 has an amino acid sequence comprising an amino acid sequence of SEQ ID NO: 31, and
said second peptide is a single domain antibody comprising three complementarity determining regions CDR1, CDR2 and CDR3, wherein:
CDR1 has an amino acid sequence comprising an amino acid sequence of SEQ ID NO: 27,
CDR2 has an amino acid sequence comprising an amino acid sequence of SEQ ID NO: 29, and
CDR3 has an amino acid sequence comprising an amino acid sequence of SEQ ID NO: 31, and
wherein said protein comprises an amino acid sequence according to SEQ ID NO:9 or an amino acid sequence having at least 90% identity to SEQ ID NO:9.

14. The protein according to claim 13, wherein the linker is a GS linker.

15. The protein according to claim 14, wherein said GS linker is of the structure $(G_xS)_n$, where x is a number between 1 and 10 and n refers to a number of repeats of the $G_xS$ sequence, where n is between 1 and 10.

16. The protein according to claim 13, wherein said protein comprises one or more further peptides binding to at least one pathogen surface component and/or at least one molecule produced by a pathogen.

17. An isolated nucleic acid molecule encoding the protein according to claim 13, a vector comprising said nucleic acid molecule, or a recombinant host cell comprising said nucleic acid molecule or vector.

18. A dietary composition comprising a protein according to claim 13, wherein the dietary composition further comprises one or more prebiotics, probiotics, synbiotics, proteins, lipids, carbohydrates, vitamins, fibers, and/or nutrients.

19. A pharmaceutical composition comprising a protein according to claim 13, a nucleic acid molecule encoding said protein, a vector comprising said nucleic acid molecule, and/or a recombinant host cell comprising said nucleic acid molecule or vector.

20. A method for the prevention or treatment of a pathogen induced infection associated with an internal and/or external surface of a subject, comprising administering to said subject a protein according to claim 13, a nucleic acid molecule encoding said protein, a vector comprising said nucleic acid molecule, a recombinant host cell comprising said nucleic acid molecule or vector, and/or a pharmaceutical composition the protein, nucleic acid molecule, vector and/or recombinant host cell and further comprising one or more excipients.

21. The method according to claim 20, wherein the infection is a gastrointestinal infection.

22. The method according to claim 20, wherein the subject is a pig.

23. The method of claim 20 wherein said pathogen induced infection is post-weaning diarrhea (PWD) or Edema disease.

* * * * *